(12) United States Patent
Jiang et al.

(10) Patent No.: US 9,663,055 B2
(45) Date of Patent: May 30, 2017

(54) SAFETY PROTECTION APPARATUS

(71) Applicants: Bing Jiang, Liaoning (CN); Bolun Jiang, Liaoning (CN)

(72) Inventors: Bing Jiang, Liaoning (CN); Bolun Jiang, Liaoning (CN)

( * ) Notice: Subject to any disclaimer, the term of this patent is extended or adjusted under 35 U.S.C. 154(b) by 0 days.

(21) Appl. No.: 14/362,086

(22) PCT Filed: Dec. 12, 2012

(86) PCT No.: PCT/CN2012/086416
§ 371 (c)(1),
(2) Date: May 30, 2014

(87) PCT Pub. No.: WO2013/086977
PCT Pub. Date: Jun. 20, 2013

(65) Prior Publication Data
US 2014/0353953 A1    Dec. 4, 2014

(30) Foreign Application Priority Data

Dec. 13, 2011  (CN) .......................... 2011 1 0412815
Dec. 27, 2011  (CN) .......................... 2011 1 0443791
(Continued)

(51) Int. Cl.
B60R 21/02    (2006.01)
B60N 2/28     (2006.01)
B60N 3/00     (2006.01)

(52) U.S. Cl.
CPC ............ B60R 21/02 (2013.01); B60N 2/2806 (2013.01); B60N 2/2821 (2013.01);
(Continued)

(58) Field of Classification Search
CPC .. B60N 2/2821; B60N 2/2833; B60N 2/2854; B60N 2/2806; B60N 2021/022;
(Continued)

(56) References Cited

U.S. PATENT DOCUMENTS 1,176,799 A * 3/1916 Watt ..................... B60N 2/2854
                                                    5/104
1,204,416 A * 11/1916 Doser .................. B60N 2/2854
                                                    224/486
(Continued)

FOREIGN PATENT DOCUMENTS

| CN | 2421199 Y    | 2/2001  |
| CN | 1746058 A    | 3/2006  |
| CN | 101857007 A  | 10/2010 |
| DE | 195 40 962 A1 | 5/1997 |
| DE | 102 26 804 A1 | 10/2003 |
| JP | 2003-2096 A  | 1/2003  |

OTHER PUBLICATIONS

International Search Report (ISR) (PCT Form PCT/ISA/210) in International Patent Application No. PCT/CN2012/086416 mailed on Mar. 21, 2013.

*Primary Examiner* — Paul N Dickson
*Assistant Examiner* — Joselynn Y Sliteris
(74) *Attorney, Agent, or Firm* — Ping Wang; Andrew Kurth Kenyon LLP

(57) ABSTRACT

The present invention relates to a safety protection apparatus for motor traffic means, comprising a support frame fixedly connected to a seat of a motor traffic means and a protection cabin for accommodating an infant. The upper end of the protection cabin is rotatably connected to the support frame, and a damping shock-absorption component is provided between the protection cabin and support frame or the seat. The apparatus of the present can be adapted for motor traffic means such as a passenger car, a truck, or a steamboat, etc., and, adapted respectively for adults and infants. The apparatus of the present invention has the following beneficial effects: protecting the passengers from direct damage from external force by providing a protection cabin; buffering the shock caused by emergency braking or collision by providing a rotatable mechanism, consuming energy by a damping (Continued)

component and providing comprehensive protection for infants or adults in prone position.

8 Claims, 30 Drawing Sheets

(30) Foreign Application Priority Data

| Dec. 27, 2011 | (CN) | ................... | 2011 1 0443797 |
| Jan. 12, 2012 | (CN) | ................... | 2012 1 0008132 |
| Jan. 19, 2012 | (CN) | ................... | 2012 1 0016755 |
| Jan. 19, 2012 | (CN) | ................... | 2012 1 0016762 |
| Feb. 2, 2012 | (CN) | ................... | 2012 1 0022909 |
| Mar. 16, 2012 | (CN) | ................... | 2012 1 0069726 |
| Mar. 16, 2012 | (CN) | ................... | 2012 1 0069727 |
| May 3, 2012 | (CN) | ................... | 2012 1 0138190 |

(52) U.S. Cl.
CPC ......... *B60N 2/2833* (2013.01); *B60N 2/2854* (2013.01); *B60N 2/2884* (2013.01); *B60N 3/00* (2013.01); *B60R 2021/022* (2013.01)

(58) Field of Classification Search
CPC .. B60N 3/00; B60N 2/2884; B60R 2021/022; B60R 21/02
See application file for complete search history.

(56) References Cited

U.S. PATENT DOCUMENTS

| 3,054,637 | A | * | 9/1962 | Pambello | ............. | A47D 11/005 |
| | | | | | | 224/155 |
| 4,790,593 | A | * | 12/1988 | Davalos | ............... | B60N 2/2884 |
| | | | | | | 297/250.1 |
| 5,884,967 | A | * | 3/1999 | Gasper | ................... | B60N 2/286 |
| | | | | | | 297/216.11 |
| 6,428,044 | B1 | | 8/2002 | Ghantae | | |
| 6,439,660 | B1 | | 8/2002 | Guenther | | |
| 6,554,343 | B2 | * | 4/2003 | Sugiyama | ............. | B60N 2/283 |
| | | | | | | 296/68.1 |
| 6,612,606 | B1 | | 9/2003 | Bergenheim et al. | | |
| 8,632,124 | B2 | * | 1/2014 | Clement | ............. | B60N 2/2821 |
| | | | | | | 297/216.11 |

* cited by examiner

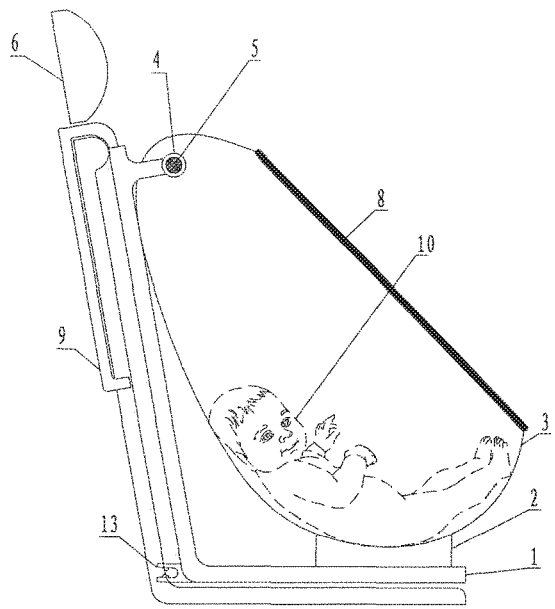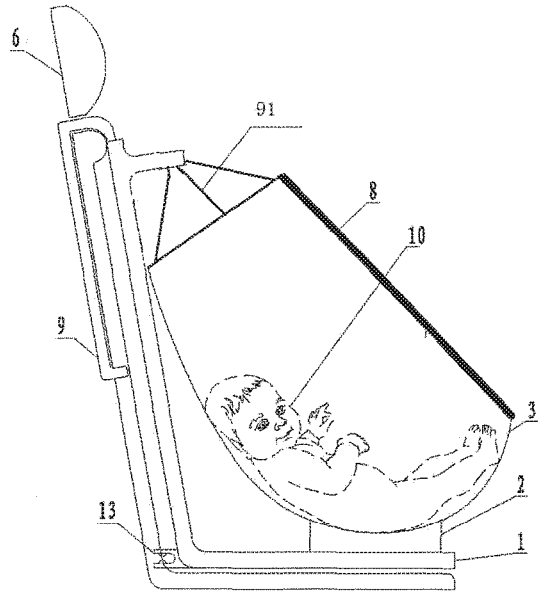
FIG. 2A　　　　　　　　FIG. 2B
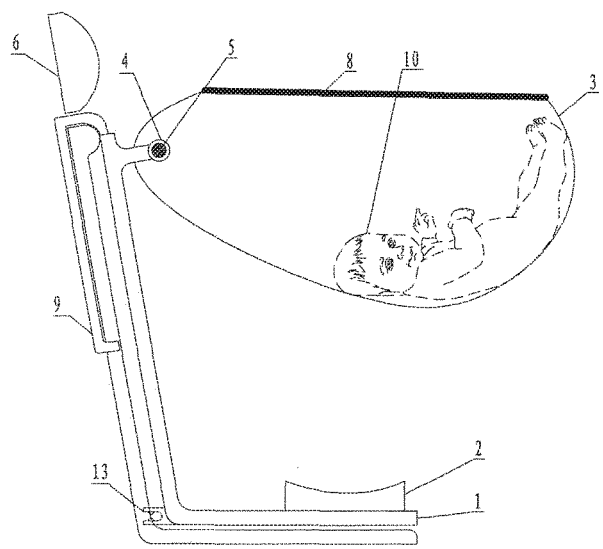
FIG. 3

SAFETY PROTECTION APPARATUS

This is a national stage application of International Patent Application No. PCT/CN2012/086416, filed Dec. 12, 2012, which claims priority to Chinese Patent Application No. 201110412815.7, filed Dec. 13, 2011; Chinese Patent Application No. 201110443797.9, filed Dec. 27, 2011; Chinese Patent Application No. 201110443791.1, filed Dec. 27, 2011; Chinese Patent Application No. 201210008132.X, filed Jan. 12, 2012; Chinese Patent Application No. 201210016762.1, filed Jan. 19, 2012; Chinese Patent Application No. 201210016755.1, filed Jan. 19, 2012; Chinese Patent Application No. 201210022909.8, filed Feb. 2, 2012; Chinese Patent Application No. 201210069727.6, filed Mar. 16, 2012; Chinese Patent Application No. 201210069726.1, filed Mar. 16, 2012; and Chinese Patent Application No. 201210138190.4 filed May 3, 2012. The entirety of all of the aforementioned applications is incorporated herein by reference.

FIELD OF THE INVENTION

The present application relates to a passive safety protection technical field, in particular, it relates to a safety protection apparatus used on the motor traffic means such as cars, steamboats, etc., which can provide effective protection for the adults, children and infants in prone position.

BACKGROUND OF THE INVENTION

In order to protect a passenger's safety, the seats of various motor traffic means will be installed with various safety protection apparatuses, such as various safety belt or child seats. For an adult, in the event of a frontal collision accident, seat belts protect passengers as well as constraint the torso of the passengers on the seat, but the passenger's head will continue to move because of inertia, thereby acting force occurs between the head and body, therefore, the passenger's body still may suffer serious damage, especially the cervical vertebra. For a child, if the seat belt or child seat is adopted as a protective apparatus, due to he sits in seated position, when a frontal collision accident occurs, although the torso is bound on the seat, the head will still lean forward and backward because of inertia, thereby causing damage to the cervical vertebra. For an infant, generally he cannot sit by himself, or cannot sit for a long time, but can only lie flat, or cuddled in the arms of an adult, thus safety protection lacks. The prior art has not solved the safety protection problems for infants in a car.

In addition, for adults, the prior art lacks the apparatus that is able to protect the safety of adults in a prone position state, especially for the pregnant women and full-time truck drivers, there is a big risk when resting in the car in prone position.

SUMMARY OF THE INVENTION

Regarding the above defects exist in the prior art, the problem to be solved by the present invention is to provide a safety protection apparatus for motor traffic means that can effectively protect the infants or adults in prone position.

In order to solve the above problem, the technical solution adopted in the first embodiment of the present invention is: a safety protection apparatus for motor traffic means, comprising a support frame fixedly connected to a seat of said motor traffic means and a protection cabin for accommodating an infant, said protection cabin and support frame are rotatably connected, a damping shock-absorption component is provided between said protection cabin and support frame or between said protection cabin and the seat.

The technical solution adopted in the second embodiment of the present invention is: a safety protection apparatus for motor traffic means, comprising a support frame fixedly connected to a seat of said motor traffic means and a protection cabin for accommodating an infant, both ends of the protection cabin are rotatably connected to said support frame, a damping spring or rubber block is provided between the bottom end of said protection cabin and support frame.

The technical solution adopted in the third embodiment of the present invention is: a safety protection apparatus for motor traffic means for protecting an adult in prone position, and characterized in that, comprising a head portion cabin for protecting the head portion of a human and a main cabin body for protecting the lower portion of the head portion of the human, one end of the head portion cabin that towards said main cabin body is provided with an opening; said head portion cabin and main cabin body are both connected to a vehicle seat, and the head portion cabin and the main cabin body are flexibly connected. The third embodiment can also adopt the following solution: a safety protection apparatus for motor traffic means for protecting an adult in prone position, comprising a rigid head portion cabin for protecting the head portion of a human and one or more restraint straps for restraining the lower portion of the head portion of the human; said head portion cabin is fixedly connected to the vehicle seat, the middle part of the restraint straps is connected to the LATCH interface at the lower end of the vehicle seat via a LATCH joint, both ends of the restraint straps are provided with opposite plug and bayonet mated with each other.

The technical solution adopted in the fourth embodiment of the present invention is: a safety protection apparatus for motor traffic means installed in a cab of a truck, comprising a bed body and a suspension connection mechanism for rotatably connecting said bed body to the top portion of said cab, the lower portion of said bed body is provided with a damping component.

The technical solution adopted in the fifth embodiment of the present invention is: a safety protection apparatus for motor traffic means, comprising a cylindrical protection cabin fixedly connected to a vehicle seat and a bed provided within the protection cabin, a plurality of ring lead rails are provided along the circumferential direction thereof within said protection cabin, said ring lead rails are provided with a slide rail thereon in cooperation therewith, both sides of said bed extending upwardly to surround a passenger in prone position, a lower side of the bed being fixedly connected with the slide rail via a support shore and is in synchronous motion with it; an end of said protection cabin is of an open-shaped, an end of said bed extends out of the end of said protection cabin provided with an opening. As an embodiment replacing the fifth embodiment: a safety protection apparatus for motor traffic means, comprising a cylindrical protection cabin fixedly connected to a vehicle seat and a bed provided within the protection cabin, a plurality of ring lead rails are provided along the circumferential direction thereof within said protection cabin, said ring lead rails are provided with a slide rail thereon in cooperation therewith, both sides of said bed extending upwardly to surround a passenger in prone position; said protection cabin is provided with a plurality of slideways along the length direction thereof, said slideway is secured to said slide rail, the lower side of said bed is provided with a guide bar in cooperation with the slideway.

The safety protection apparatus of the present invention has the following beneficial effects: 1. protecting the passengers from direct damage from external forces by providing a rigid or flexible protection cabin; 2. buffering impact to the passengers due to emergent braking or collision by providing a rotatable mechanism, dissipating energy by the damping components to provide comprehensive protection for the infants and adults in prone position.

BRIEF DESCRIPTION OF THE DRAWINGS

FIGS. 2A and 2B depict a structural perspective view of the safety protection apparatus shown in FIG. 1;

FIG. 3 is a schematic diagram of the safety protection apparatus shown in FIG. 1 when the protection cabin sways;

DETAILED DESCRIPTION OF THE INVENTION

A further detail description of the present invention is made by combining the accompanying drawings and specific examples, but not used as a definition to the present invention, comprising 30 examples in total divided into 5 sets. The safety protection apparatus of the present invention can be used on motor traffic means such as a passenger car, a truck, and a steamship to provide reliable protection for the passengers in prone position. The situation of applied to a vehicle is illustrated hereinafter as an example.

The first set of examples comprise Example 1 to Example 7, in Examples 1-4, the shape of the protection cabin likes an eggshell that is put vertically, the upper end of the protection cabin is rotatably connected to the support frame, which is adapted for infants to sit facing the vehicle advancing direction. However, in Examples 5-7, the shape of the protection cabin is ellipsoid that is horizontally and transversely put, just like an egg that is horizontally provided, both ends of the protection cabin are rotatably connected with the support frame, which is adapted for the infants to lie therein.

Example 1

Figure 1:
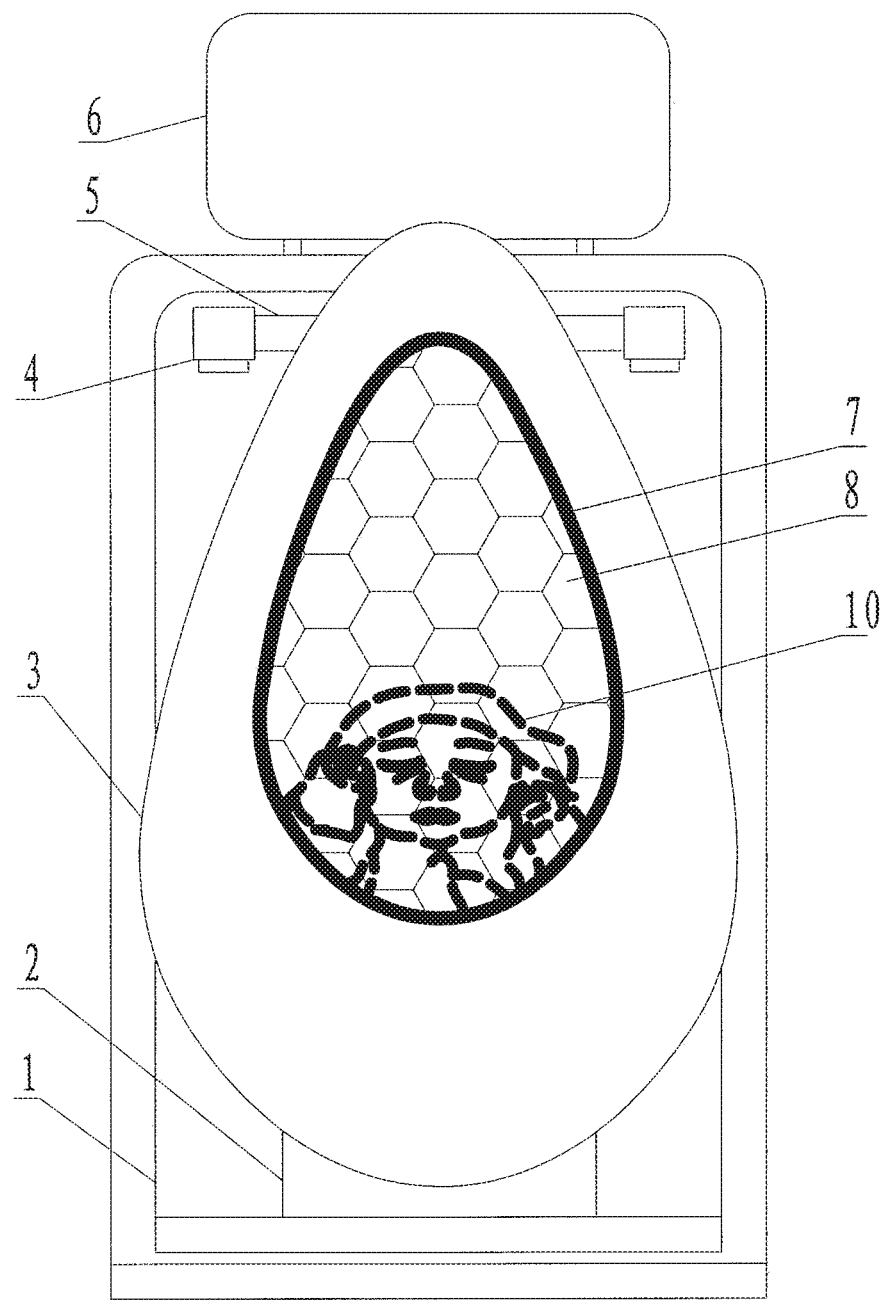
FIG. 1 is a structural schematic diagram of the safety protection apparatus of Example 1 of the present invention.

As shown in FIGS. 1-3, the safety protection apparatus of Example 1 of the preset invention used for motor traffic means comprises protection cabin 3 and support frame 1. In this example, protection cabin 3 is an integrally rigid housing, the upper end of protection cabin 3 is suspended on the support frame 1 via a suspension assembly formed by a shaft 5 and a shaft sleeve 4. As one of the preferred solutions, an opening 7 is provided at the front end of protection cabin 3, a protective net 8 is provided on opening 7 to cover opening 7, and a damping shock-absorption component is provided between protection cabin 3 and support frame 1. In this example, said damping shock-absorption component is friction pad 2 secured on the bottom of support frame 1; support frame 1 is secured on the seat 6 via a plurality of fixing straps 9. Friction pad 2 can be made of material with a high friction coefficient, such as rubber, etc.; said damping shock-absorption component can also be designed to other shapes that can form a certain resistance to the protection cabin 3 without preventing swaying when high acceleration of the vehicle occurs. A person skilled in the art can adjust the shape and/or material of the damping shock-absorption component according to his actual needs, change the initial condition that makes protection cabin 3 sway, i.e., the minimum acceleration value when protection cabin 3 sways.

As shown in FIG. 2A, when the vehicle drives in a normal driving condition, infant 10 is in a lying condition, the face of infant 10 substantially faces the vehicle advancing direction. As shown in FIG. 3, when a collision occurs or a severe brake happens, the speed of a vehicle will rapidly decrease, its acceleration value is very large. Due to support frame 1 is fixedly connected with seat 6, support frame 1 also decreases in speed, but protection cabin 3 has a tendency to sway forward due to inertia; certainly, protection cabin 3 should first overcome the resistance force of friction pad 2 before swaying. The purpose of providing friction pad 2 is: firstly, to prevent protection cabin 3 from swaying in a normal brake; secondly, to achieve an effect of shock absorption; furthermore, to achieve a damping energy dissipation effect in the process of swaying. As the lifting of protection cabin 3, the posture of infant 10 in protection cabin 3 also changes. As shown in FIG. 3, when protection cabin 3 lifts to the highest position, the buttocks of the infant substantially towards the front direction, largely bearing the acting force between it and protection cabin 3. Protection cabin 3 lifts quickly to the position of FIG. 3 in a short time after the collision, which effectively prevents the head portion of the infant from pitching to hurt the neck. In addition, protection cabin 3 also achieves the effect of protecting the infant 10 from being hurt by foreign bodies. Protection cabin 3 cannot sway upwardly more due to the restriction of the suspension assembly but return motion, after that, friction between the bottom of protection cabin 3 and friction pad 2 on the bottom of support frame 1 occurs, thus the energy is consumed, making protection cabin 3 stop moving.

As another set of examples, support frame 1 and seat 6 of the vehicle can be fixedly connected via fixing straps 91, support frame 1 is provided with a latch joint or other joint that is adapted to be matched with the socket for vehicles. As shown in FIG. 2B, protection cabin 3 can be suspended on the upper end of support frame 1 via a plurality of fixing straps 91. The free end of fixing strap 91 can be provided with a latch joint to be connected with the standard interface provided on seat 6 (FIG. 2B).

As shown in FIG. 3, the lower end of support frame 1 is provided with a latch joint 13 or other joint that is adapted to be matched with the socket for vehicles to be fixedly connected with seat 6.

As shown in FIGS. 2A, 2B and 3, support frame 1 is of a L-type. Support frame 1 can adopt a detachable or fixing connection manner to be secured on seat 6. The detachable manner includes socket connection, bundle connection or bolt connection; said fixing connection manner includes connection manners like welding or bonding, etc.

Further, a damping component (not shown in Figures) can also be provided between the shaft 5 and the shaft sleeve 4 for friction energy dissipation. The damping component can select material that has a relatively large friction coefficient and hard wearing so as to function to dissipate energy.

Further, the damping shock-absorption component can also adopt resilient damping belt (not shown in FIG. 1, please refer to the following description) that is fixedly connected with protection cabin 3. The other end of the resilient damping belt is provided with a latch (Lower Anchors and Tethers for Children) joint or other joints that are adapted to be matched with the sockets for vehicles, such as ISO FIX (International Standards Organisation FIX) joint to be connected with seat 6 or support frame 1.

Example 2

Figure 4:
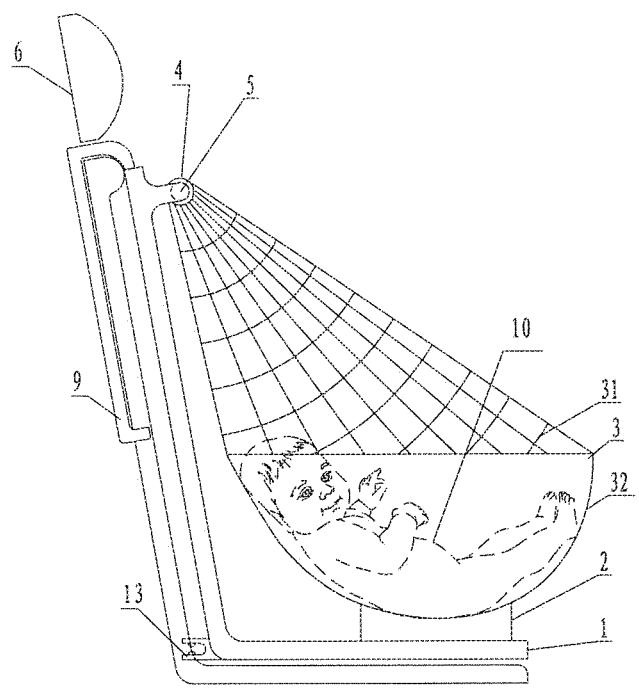
FIG. 4 is a perspective view of the safety protection apparatus of Example 2 of the present invention.

As shown in FIG. 4, it is different from Example 1 in that in the safety protection apparatus for motor traffic means of Example 2, protection cabin 3 is divided into two parts, comprising upper housing 31 and lower housing 32 that are connected together. The upper housing 31 is flexible housing and is designed as reticular in this example, lower housing 32 is rigid housing. The upper housing 31 being designed as flexible housing can improve air permeability; when the flexible housing is made from reticular material, the liquidity of air in protection cabin 3 will increase, and facilitate parents sit by the side observing the rest condition of an infant 10 in the protection cabin; better protect and take care of the travel safety of infants. On the basis of the example shown in FIG. 4, a person skilled in the art can also adopt other flexible materials to replace reticular material in FIG. 4 to make flexible housing.

Example 3

Figure 5:
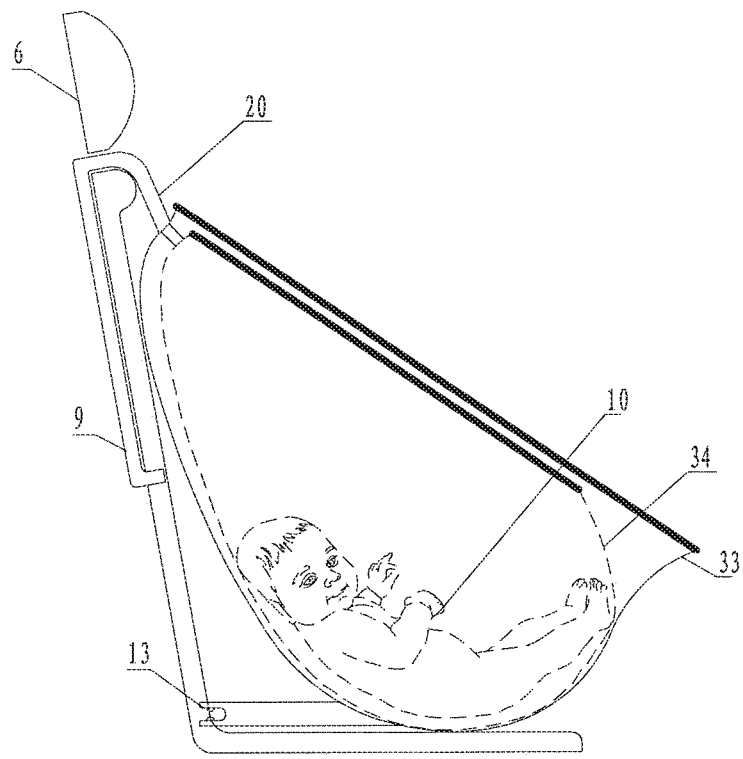
FIG. 5 is a perspective view of the safety protection apparatus of Example 3 of the present invention.
Figure 6:
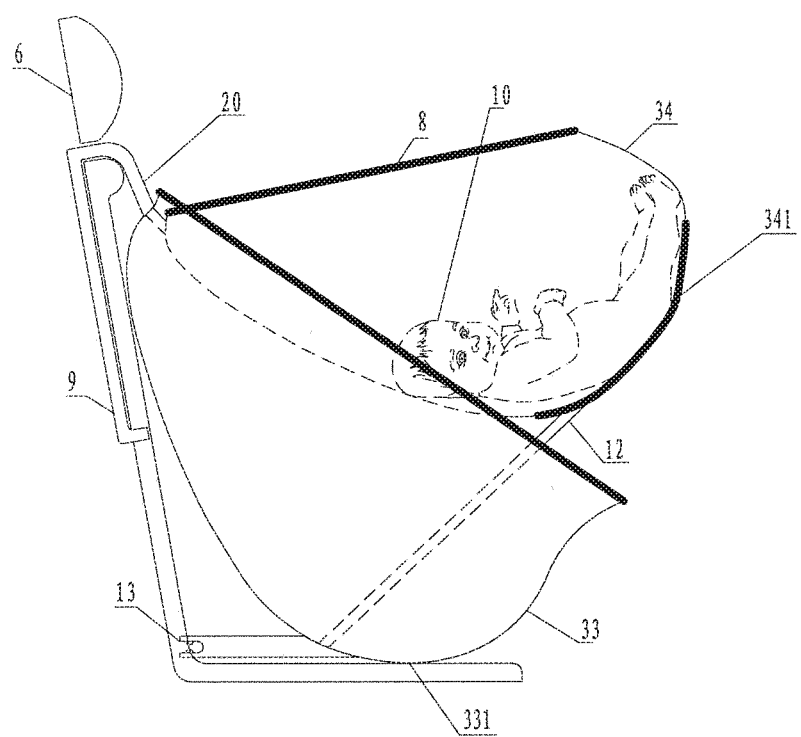
FIG. 6 is a schematic diagram of the safety protection apparatus used for motor traffic means as shown in FIG. 5 when the protection cabin sways.

As shown in FIGS. 5 and 6, the safety protection apparatus of Example 3 of the present invention used for motor traffic means is different from the above Examples 1 and 2 in: support frame 1 is not adopted in Example 3, but a suspender 20 is provided on the backrest of seat 6. Protection cabin 3 comprises an outer housing 33 and an inner housing 34 within said outer housing 33, wherein outer housing 33 is rigid housing, the upper end of outer housing 33 is connected with suspender 20, and the lower end thereof is in direct contact with seat 6. The inner housing 34 is flexible housing. The upper end of inner housing 34 is rotatably connected with outer housing 33. An opening is provided in the front portion of the outer housing 33 and inner housing 34 respectively. The opening of inner housing 34 is provided with a protection net 8, and the opening of outer housing 33 is relatively large to allow inner housing 34 to pass through in its entirety when swaying. The bottom of outer housing 33 is provided with a hollowed-out portion 331, and the bottom of inner housing 34 is provided with a rigid bottom 341 that is fitted for the hollowed-out portion 331. The rigid bottom 341 can achieve a better bearing effect. Outer housing 33 is fixedly connected with seat 6 via a plurality of fixing straps 9, the bottom of inner housing 34 is connected with outer housing 33 via one or more resilient damping belts 12 to limit the swaying degree of inner housing 34, and also achieve an effect of dissipating certain energy. Inner housing 34 is designed as flexible housing, so it is more comfortable. As shown in FIGS. 5 and 6, the lower end of outer housing 33 is fixed connected at the latch socket of seat 6 via latch joint 13. When a vehicle drives in a normal way, infant 10 is lying in inner housing 34 and under the protection of rigid outer housing 33, as the state shown in FIG. 5. When an accident or emergency braking occurs, as shown in FIG. 6, infant 10 sways following inner housing 34, which greatly buffers the crush brought by collision or braking. To avoid, in the prior art that, the head portion of infant 10 seated in child seat pitches and hurt the tender neck portion when the vehicle brakes.

Example 4

Figure 7:
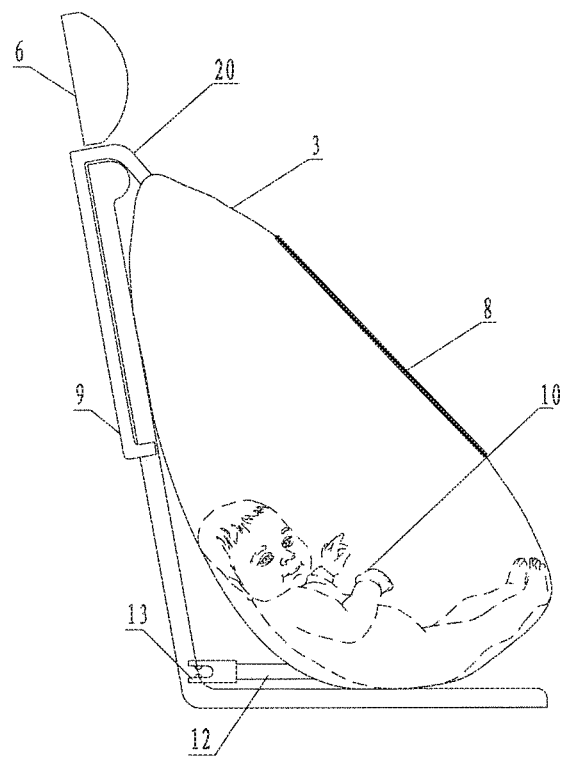
FIG. 7 is a perspective view of the safety protection apparatus of Example 4 of the present invention.
Figure 8:
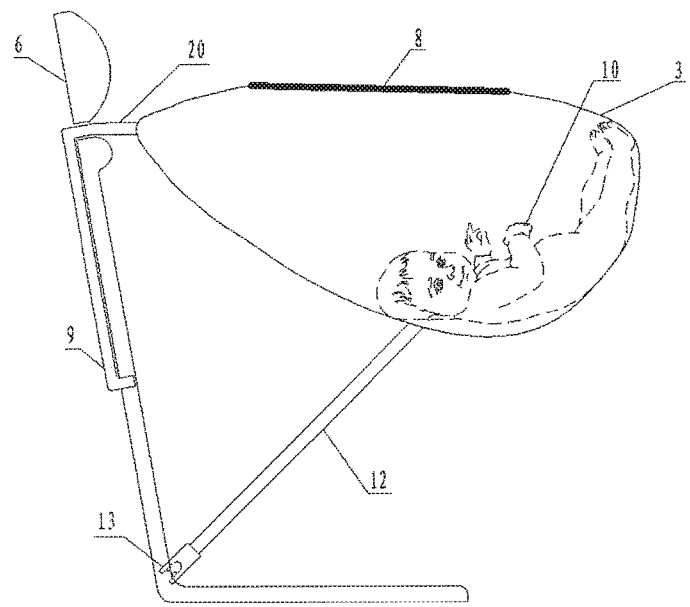
FIG. 8 is a schematic diagram of the safety protection apparatus shown in FIG. 7 when the protection cabin sways.

As shown in FIGS. 7 and 8, in Example 4, protection cabin 3 is integrally flexible housing; suspender 20 is secured to seat 6 via fixing strap 9. The upper end of protection cabin 3 is rotatably connected with suspender 20. The protection cabin 3 is similar to venter of a human body in shape and wraps up infant 10, making entire body of infant 10 feel like staying in mother's body, bringing infant 10 greater comfort and sense of safety. Lower portion of outer side of protection cabin 3 is provided with a resilient damping belt 12 having a latch joint 13 secured at the latch socket of seat 6. As shown in FIG. 8, in use, the front side of infant towards the vehicle advancing direction. When protection cabin 3 sways, resilient damping belt 12 has an effect of preventing amplitude of swing from becoming too large and an effect of damping energy dissipation.

In the above example, a latch joint can be adopted between fixing strap 9 and seat 6 in order to be fitted with the socket under latch standard. Fixing strap 9 can be replaced with a rigid suspender.

Due to the tenderness of the infant itself, Examples 1-4 change the train of thought in the prior art of tightly securing a human on the seat when an accident occurs, make the infant sway as the protection cabin in a certain degree, greatly buffer crush brought by accident or emergency braking. The buttocks of the infant toward the front direction due to the infant sways together with the cabin body, and bear the acting force of protection cabin body, protect the neck and head portions of the infant to a greatest extent. Of course, damping energy dissipation device is also necessary, the energy can be consumed via friction pad or resilient damping belt such that the protection cabin will gradually restore to be stable.

Example 5

Figure 9A:
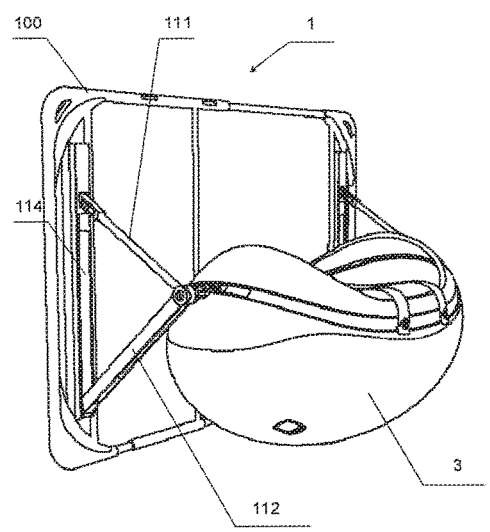
FIG. 9A is a structural schematic diagram of the safety protection apparatus of Example 5 of the present invention connected with the support frame.
Figure 9B:
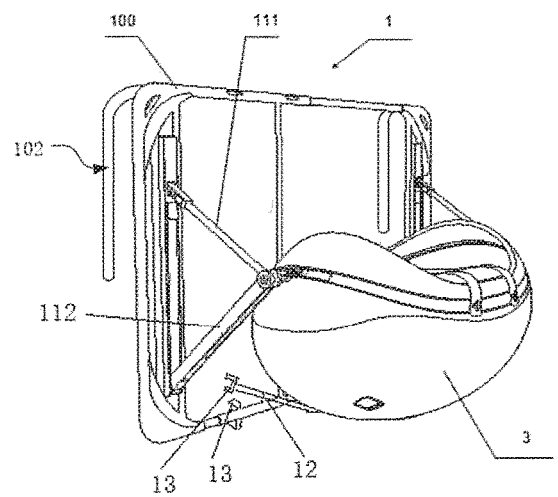
FIG. 9B is a structural schematic diagram of the safety protection apparatus of Example 5 and FIG. 9A of the present invention connected with the support frame.

Example 5 is different from the above Examples 1-4 in two points, as shown in FIGS. 9A and 9B, firstly, protection cabin 3 is of an egg shape, i.e., approximately an ellipsoid shape, whose length direction is horizontally provided. Secondly, support frame 1 includes a rectangular backframe 100 connected with the seat and two hanging brackets for hanging protection cabin 3, and both ends of the egg-shaped protection cabin 3 are respectively connected with the hanging brackets. Backframe 100 is provided with a longitudinally slide slot 114 thereon. The hanging brackets include a main lever 112 with one end rotatably connected with backframe 100 and an advance lever 111 with one end slidably connected with the slide slot 114. The other end of advance lever 111 of the protection cabin is rotatably connected with main lever 112, making advance lever 111, main lever 112 and slide slot 114 together form a triangle. Said protection cabin 3 is of an egg shape with an opening provided on the upper portion thereof, a protective screening or protection strap is provided at the opening. The both ends of egg-shaped protection cabin 3 along its length direction are connected with main lever 112 of hanging brackets via a hook. The characteristic of this example lies in: when not used, it is convenient to fold the hanging brackets on backframe 100 to decrease occupied space when uses and stores, thus to facilitate transporting and storing.

In order to be fixedly connected with the seat, the lower end of backframe 100 of support frame 1 is provided with a latch joint or ISO FIX joint connected with the seat (not shown in figure). In the example shown in FIG. 9A, backframe 100 can be connected with the backrest of the seat via seat belt with a latch joint. Although not shown in figures, similar to the previous examples, the bottom of protection cabin 3 is provided with a similar damping shock-absorption component and/or resilient damping belt.

Further, as shown in FIG. 9B, the upper end of backframe 100 can be provided as an inverted U-shaped clamping part 102 through which to be clamped on the backrest of the seat.

Example 6

Figure 10:
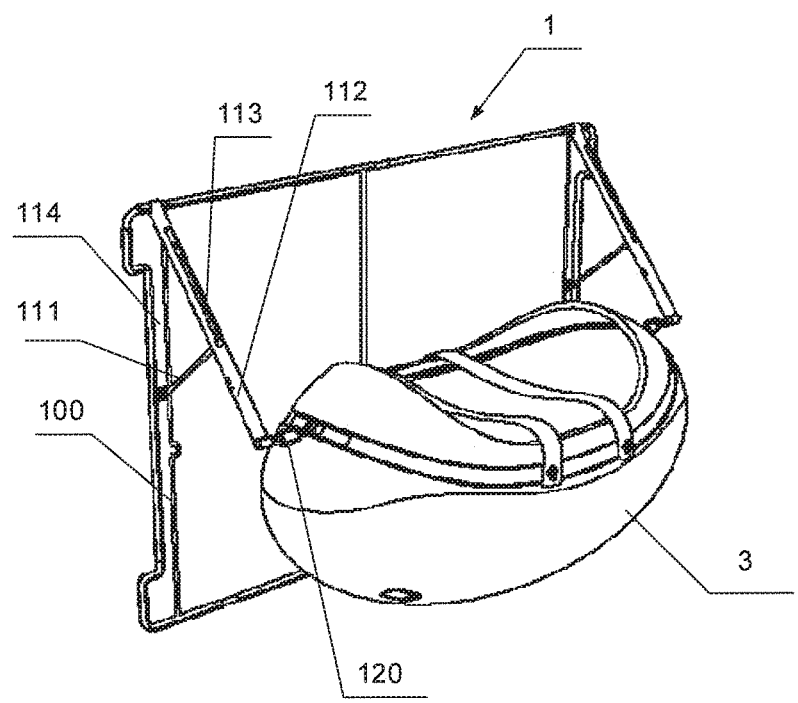
FIG. 10 is a structural schematic diagram of the safety protection apparatus of Example 6 of the present invention connected with the support frame.

As shown in FIG. 10, the difference between Example 6 and Example 5 lies in: main lever 112 is provided with an adjustment slot 113 along the length direction thereof, the other end of advance lever 111 is slidably connected with main lever 112 via adjustment slot 113. Example 6 also possesses the advantages described in Example 5.

What needs to point out is that in the above Examples 5 and 6, the "slidably connected" may be achieved by a mechanical structure, such as a mechanism consisting of a slide block and a slide slot, or a mechanism consisting of a slide wheel and a slide slot, etc., as long as the reliable sliding connection can be achieved.

Similar to Examples 1-4, in Examples 5 and 6, the bottom of protection cabin 3 is provided with a damping shock-absorption component, and a resilient damping belt that is be fixedly connected with the seat can be provided on protection cabin 3.

In Examples 5 and 6, if unexpected situation such as a collision happens, protection cabin 3 shakes forwardly due to adopting hook 120 to connect, thereby buffering the effect on the human body therein. Further, the bracket will deform to a certain degree due to a deformable triangular structure, and both advance lever 111 and main lever 112 will move to achieve the purpose of buffering. The extra energy will be consumed by damping shock-absorption component and/or resilient damping belt provided at the bottom of protection cabin 3.

Example 7

Figure 11:
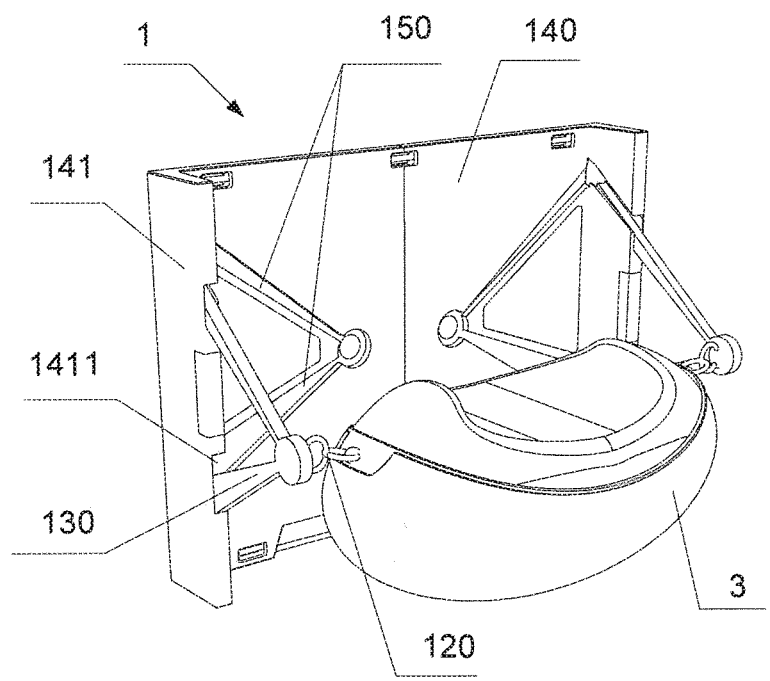
FIG. 11 is a structural schematic diagram of the safety protection apparatus of Example 7 of the present invention connected with the support frame.

The difference between Example 7 and Examples 6 and 5 lies in that the shape of support frame 1 is different, as shown in FIG. 11, the support frame of Example 7 comprises a rectangular backplate 140 connected with the seat and two triangular hanging brackets 130 for hanging protection cabin, the bottom edges of hanging bracket 130 are respectively rotatably provided at both ends of backplate 140 along the vertical direction, and both ends of backplate 140 are provided with support plate 141 for supporting the hanging bracket in an open state. A positioning slot 1411 is provided on said support plate 141 to clamp hanging brackets 130 in an open state. A receiving slot 150 is provided on backplate 140 for receiving hanging brackets 130 in a folded state; protection cabin 3 is of an egg shape, both ends of egg-shaped protection cabin 3 along the length direction thereof are respectively connected with the top end of hanging brackets 130 via hook 120. The advantage of this example is: hanging bracket 130 is folded on backplate 140 by rotating hanging bracket 130, thus facilitating storing and transporting, opened and put in positioning slot 1411 when used, so that it can be connected with protection cabin 3 via hook 120, this is very convenient.

The second set of examples includes Examples 8 to 14. The shape of protection cabin is ellipsoid in Examples 8 to 12, and in Examples 13 and 14, the shape of protection cabin is capsule shape with both ends being hemisphere and the central part being cylindrical. The second set of examples corresponds to the second embodiment in SUMMARY OF THE INVENTION.

Example 8

Figure 12:
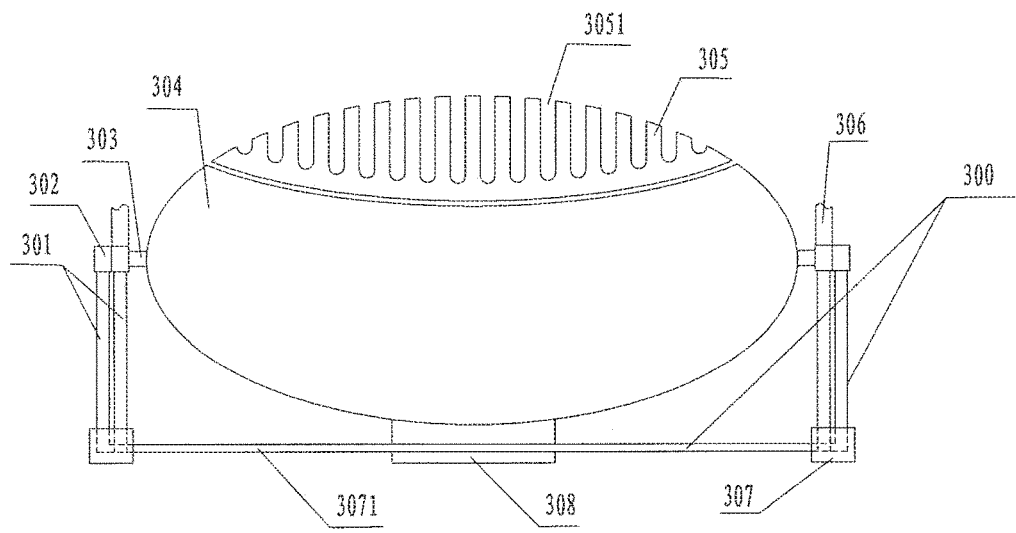
FIG. 12 is a front view of the safety protection apparatus of Example 8 of the present invention.
Figure 13:
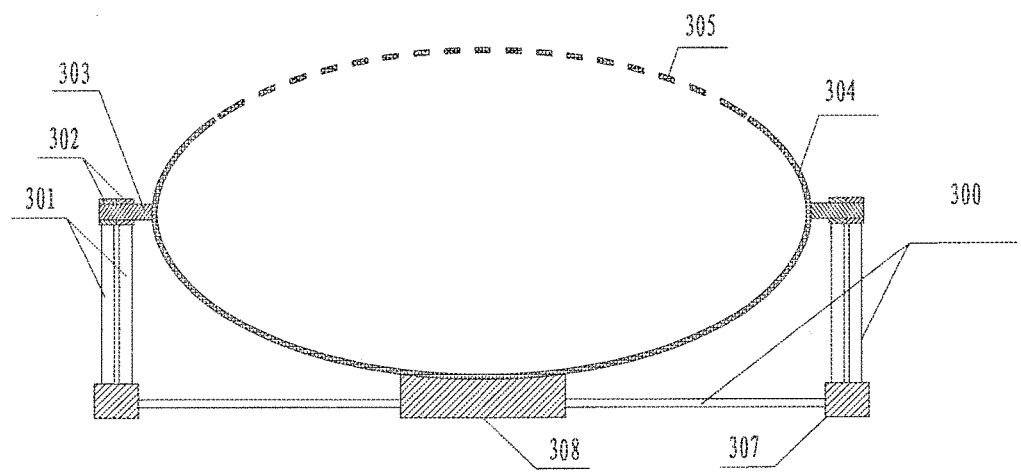
FIG. 13 is a longitudinal sectional view of the safety protection apparatus shown in FIG. 12.
Figure 14:
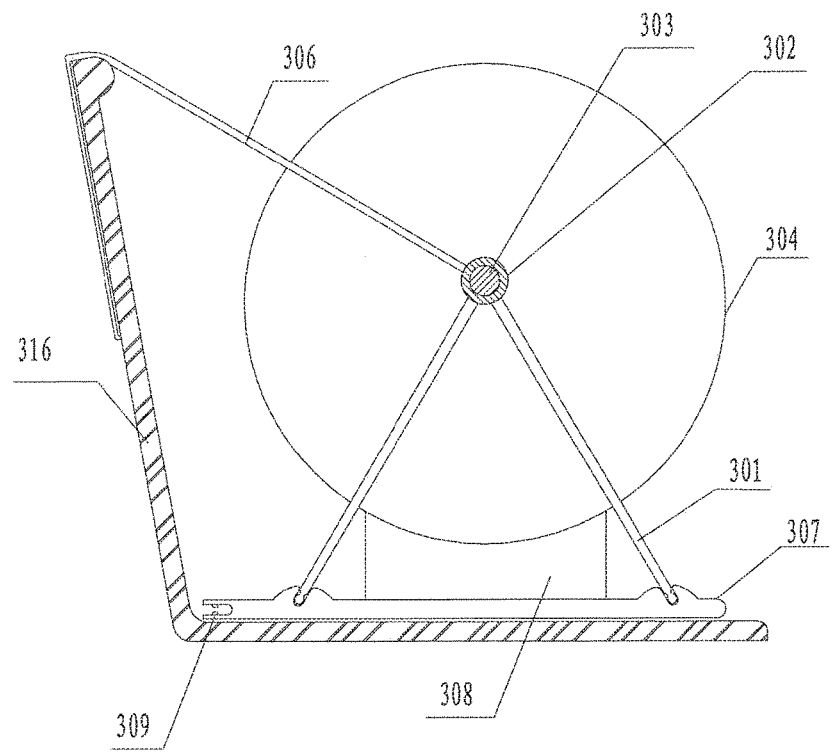
FIG. 14 is a side view of the safety protection apparatus shown in FIG. 12 (when connected to the seat)

As shown in FIGS. 12-14, the safety protection apparatus of Example 8 of the present invention for motor traffic means comprises support frame 300 that is fixedly connected with the seat of motor traffic means and protection cabin 304 for receiving an infant. Both ends of protection cabin 304 are rotatably connected with support frame 300. A block rubber 308 with a function of damping energy dissipation is provided between the bottom end of protection cabin 304 and support frame 300. The block rubber 308 is fixedly connected with the bottom of support frame 300, certainly, block rubber 308 can also be provided at the bottom end of protection cabin 304. In each case the purpose of frictional energy dissipation can be achieved. In this example, protection cabin 304 is generally ellipsoid, both ends of which along the long axis direction thereof are connected with support frame 300. Preferably, in this example, as shown in FIGS. 12 and 13, the upper side of protection cabin 304 is provided with an opening at which a protection cover 305 in cooperation therewith is provided. A long strip-shape riser vent 3051 is provided on protection cover 305.

As shown in FIGS. 12 and 14, in this example, support frame 300 comprises two opposite triangular brackets, and each bracket comprises a base seat 307 and two support levers 301 that are fixedly connected with base seat 307. Base seats 307 are connected via connection lever 3071, and the top end of the brackets are respectively provided with a suspension connection mechanism that is connected with protection cabin; base seat 307 is provided with a LATCH joint 309 that is fixedly connected with seat 316, and adapted for the LATCH interface on the seat. LATCH joint 309 can also be replaced with ISOFIX joint, so as to be adapted with ISOFIX interface on the seat. The upper end of the bracket, that is, the connection site of the two support levers 301, is fixedly connected with seat 316 via fixing strap 306. The end of fixing strap 306 that is connected with seat 316 is also provided with a LATCH joint or ISOFIX joint (not shown in figures). As shown in FIGS. 12-14, in this example, the suspension connection mechanism comprises rotation shaft 303 and shaft sleeve 302. The shaft sleeve 302 is provided at the top end of the bracket, and rotation shaft 303 is fixedly connected at both ends of protection cabin 304.

As an alternative solution, the suspension connection mechanism comprises ferrules and hook for connecting to ferrules. The ferrules are provided at the top end of the bracket, and the hook is provided at both ends of the protection cabin.

As another alternative solution, the suspension connection mechanism comprises a universal joint and a hook. The universal joint is provided at the top end of the bracket, and the hook is provided at both ends of the protection cabin.

In order to record the weight, height and image information of the infant in the protection cabin, a micro-recording device, a micro-video device and a length measuring memory device are provided in the protection cabin; the bottom of the protection cabin is provided with a weight measuring memory device. The micro-video device can be a camera, and the micro-recording device is a microphone, the length measuring memory device and the weight measuring memory device are corresponding length and weight sensors. A microprocessor and a storage device can be added to the protection cabin to store corresponding information.

Example 9

Figure 15:
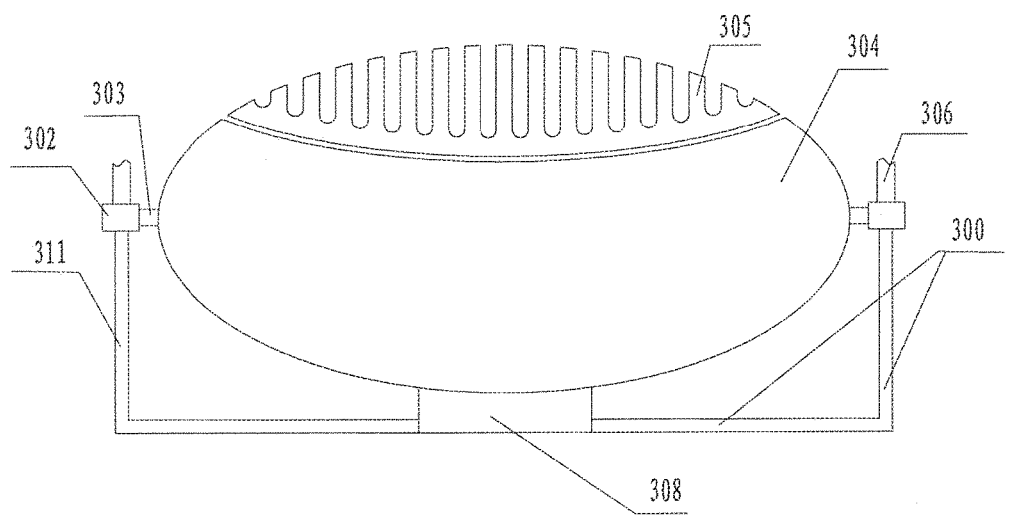
FIG. 15 is the front view of the safety protection apparatus of Example 9 of the present invention.
Figure 16:
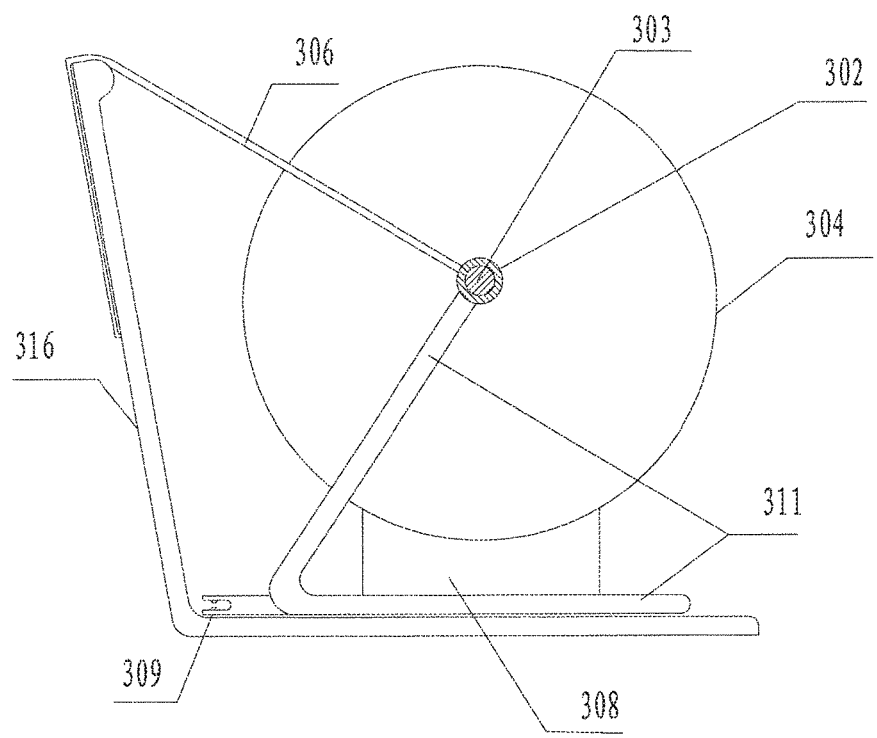
FIG. 16 is a side view of the safety protection apparatus shown in FIG. 15 (when connected to the seat)

The difference between Example 9 and Example 8 lies in that the structure of the bracket is different, as shown in FIGS. 15 and 16, the support frame 300 comprises two opposite V-shaped brackets 311, each bracket 311 being integrally bent molded; one side of the bracket 311 is horizontally provided, and the sides of the two brackets 311 that are horizontally provided are connected via connection lever 3071. The top end of each bracket 311 is provided with a suspension connection mechanism that is connected with protection cabin 304. The bottom of each bracket 311 is connected with the lower end of seat via a connecting piece 324, and a LATCH joint is provided on the connecting piece 324. In this example, the suspension connection mechanism comprises a rotation shaft 303 and shaft sleeve 302, and other structures are similar to that of Example 8, thus further explanation is omitted here.

Example 10

Figure 17:
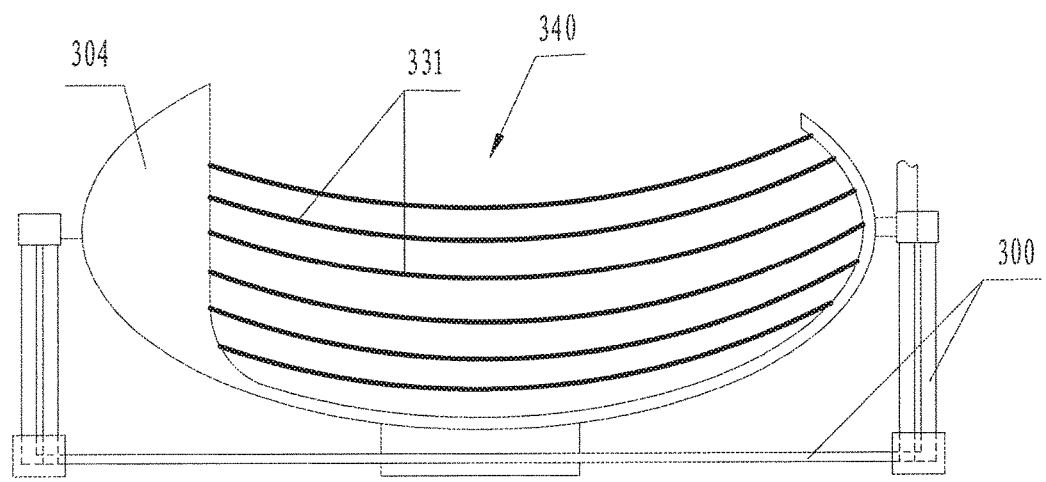
FIG. 17 is a front view of the safety protection apparatus of Example 10 of the present invention.

In the above Examples 8 and 9, protection cabin 304 is integrally rigid housing; while in Example 10, as shown in FIG. 17, both ends of protection cabin 304 are rigid structure, and the central part of protection cabin 304 is provided with a nick 340, at which a plurality of flexible straps 331 that are connected on protection cabin 304 to surround the nick, which can enhance the air permeability and comfort of protection cabin 304.

Example 11

Figure 18:
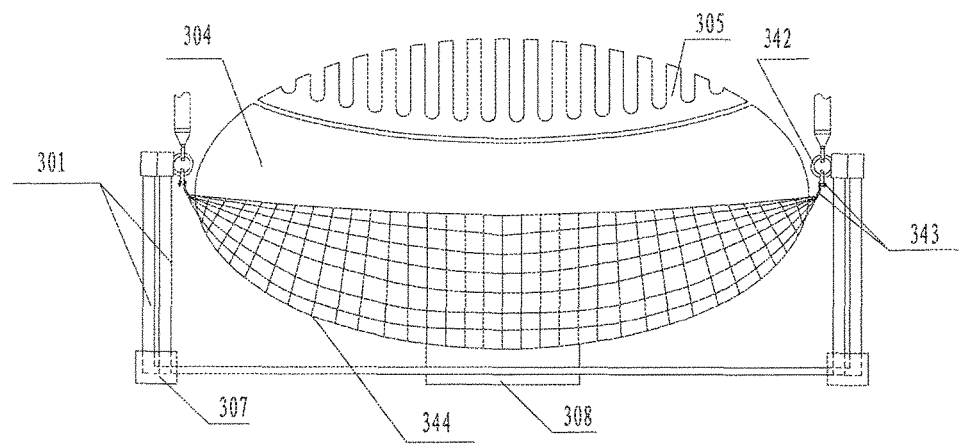
FIG. 18 is a front view of the safety protection apparatus of Example 11 of the present invention.

As shown in FIG. 18, what is different from Example 8 is that in Example 11, the top end of support lever 301 is provided with a ferrule 342. The safety protection apparatus of Example 11 further comprises a flexible net 344 that wraps up protection cabin 304. Both ends of flexible net 344 are provided with hook 343 that is connected with ferrule 342. Fixing strap 306 is connected with ferrule 342 via a hook. Protection cabin 304 is covered in flexible net 344 and sways with flexible net 344; no connection component is required to be provided on protection cabin 304, and the whole structure of protection cabin 304 is not damaged. The rotatable connection between protection cabin 304 and support lever 301 can be achieved under the circumstance that the whole strength of protection cabin 304 is ensured.

Example 12

Figure 19:
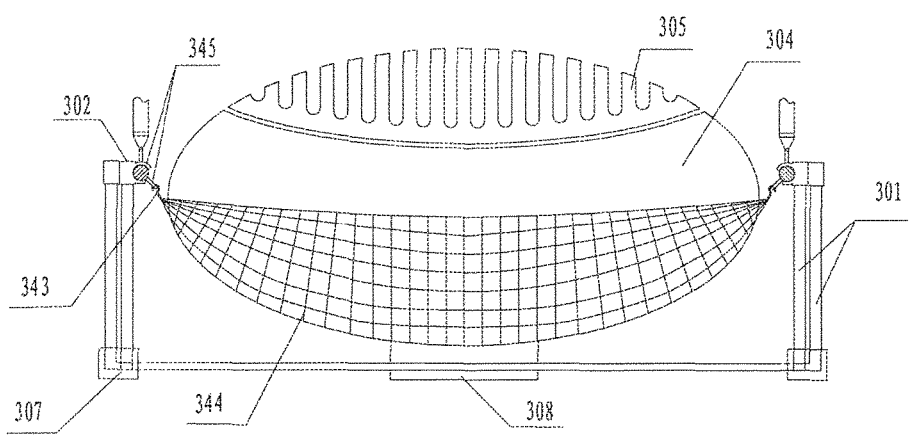
FIG. 19 is a front view of the safety protection apparatus of Example 12 of the present invention.

As shown in FIG. 19, the difference between Examples 12 and 11 lies in that a universal joint 345 is adopted to connect the support lever 301 and flexible net 344 to replace ferrule 342 and hook 343 in Example 11.

Example 13

Figure 20:
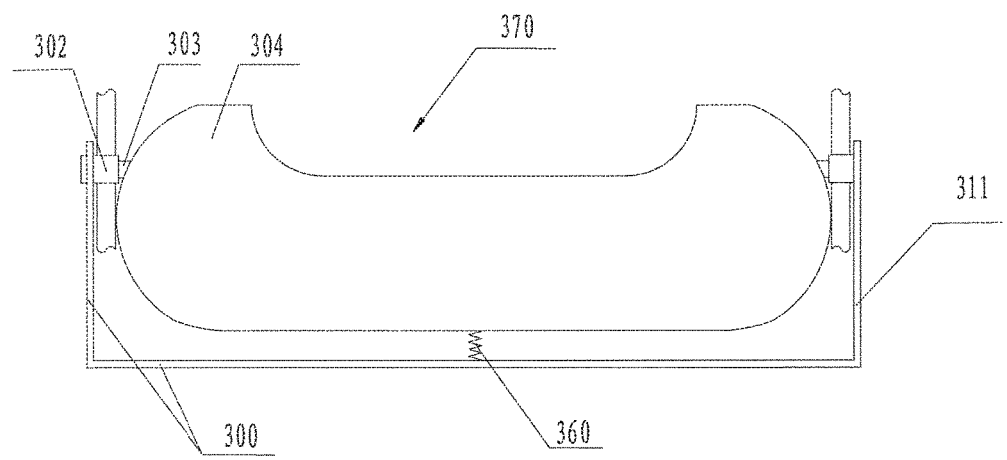
FIG. 20 is a front view of the safety protection apparatus of Example 13 of the present invention.

As shown in FIG. 20, the difference between Examples 13 and 8 lies in that protection cabin 304 is capsule shape with both ends being hemisphere and the central part being cylindrical, and the upper portion of protection cabin 304 is provided with an opening. A damping spring 360 is provided between the bottom of protection cabin 304 and support frame 300 as a damping component.

Example 14

Figure 21:
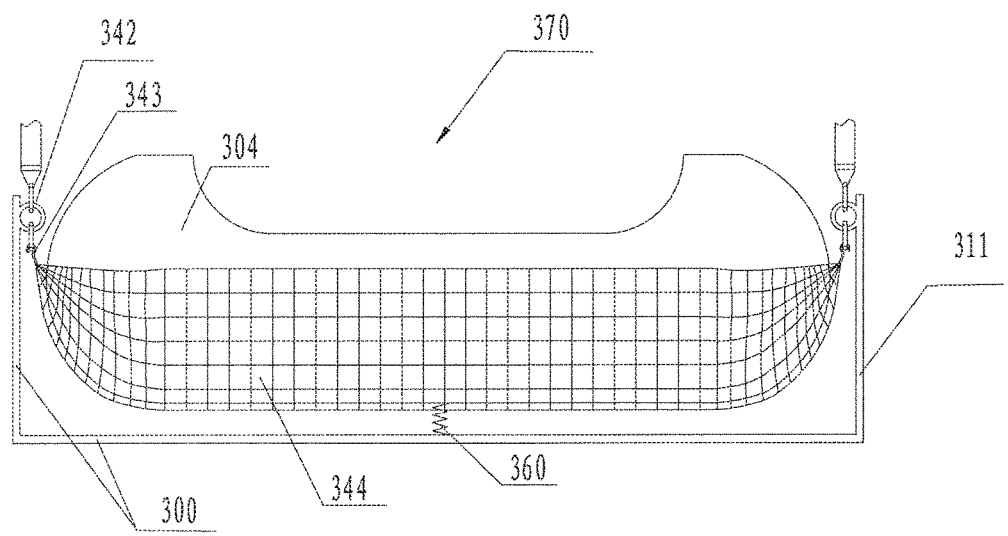
FIG. 21 is a front view of the safety protection apparatus of Example 14 of the present invention.

As shown in FIG. 21, the difference between Examples 14 and 13 lies in that the connection manners between protection cabin 304 and support frame 300 are different. In Example 13, protection cabin 304 and support frame 300 are connected by adopting rotation shaft and shaft sleeve, while the safety protection apparatus in Example 14 further comprises a flexible net 344 wrapping up the protection cabin 304. The top end of bracket 311 of support frame 300 is provided with a ferrule 342, both ends of flexible net 344 are provided with hook 343 connected with ferrule 342. The advantage of Example 14 lies in that the connection manner is simple and easy to use.

According to the above description to the safety protection apparatus of the second set of examples, the present invention rotatably connect the protection cabin with the support frame via a suspension connection mechanism, and the protection cabin can sway forward and backward in the support frame, dissipating energy by using friction of the damping spring or block rubber. According to the description to Examples 8 to 14, it can be seen that the safety protection apparatus decreases or eliminates the damage to human body in an accident of the vehicle from the following aspects: 1. transform kinetic energy to potential energy as the rotation of the protection cabin; 2. kinetic energy is transformed to the elastic potential energy of a limit spring or the heat energy generated by friction with the rubber block; 3. the human and protection cabin are not separated during a collision, thus avoiding the damage caused by collide with other structures in the vehicle; 4. the protection cabin can resist the glass fragment or other objects caused by collision to impale.

The third set of examples includes Examples 15 to 21, wherein the main cabin body in Examples 15, 16 and 17 is flexible structure in the form of a sleeping bag. The third set of examples corresponds to the third embodiment described in the SUMMARY OF THE INVENTION.

Example 15

Figure 22:
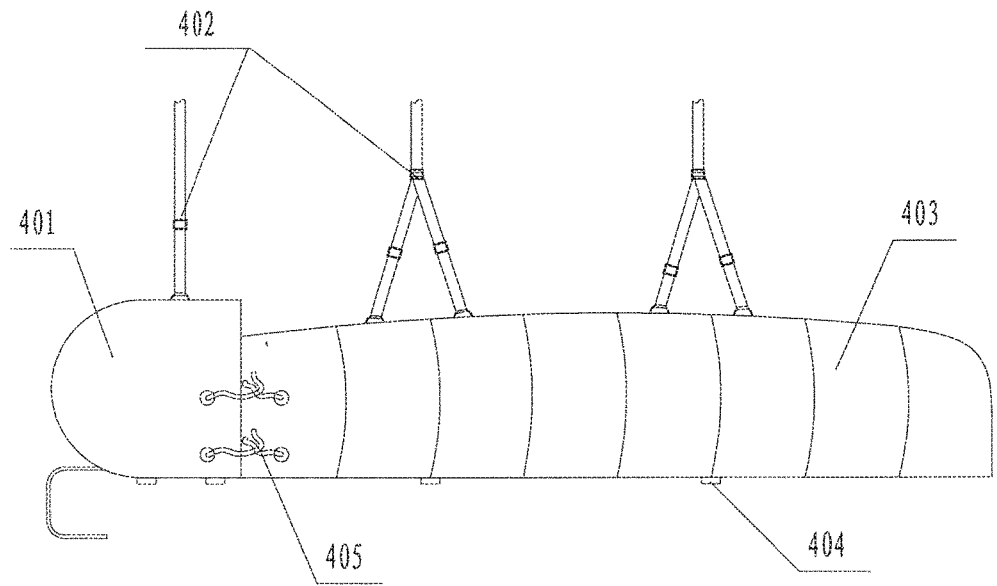
FIG. 22 is a stereostructural schematic diagram of the safety protection apparatus of Example 15 of the present invention.
Figure 23:
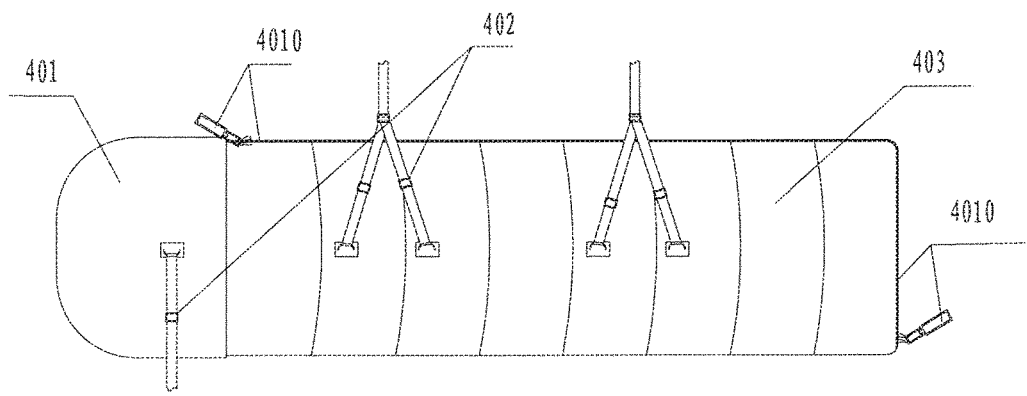
FIG. 23 is a plan view of the safety protection apparatus shown in FIG. 22.
Figure 24:
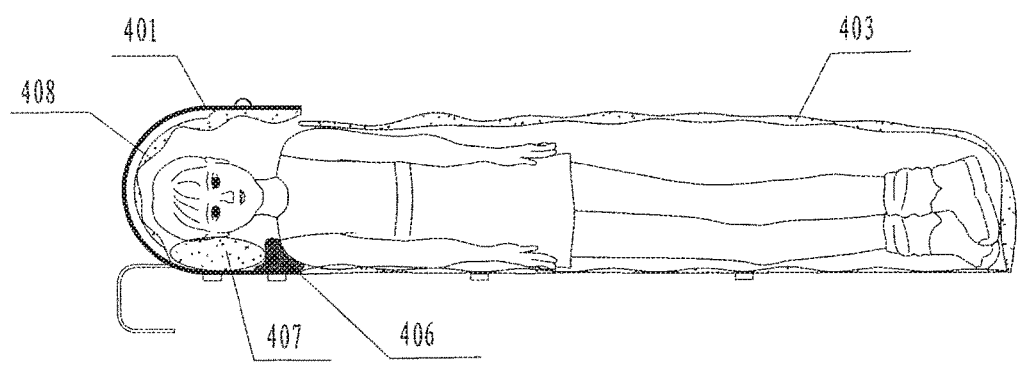
FIG. 24 is a longitudinal section view of the safety protection apparatus shown in FIG. 22.

As shown in FIGS. 22-24, the safety protection apparatus of Example 15 for protecting adults in prone position comprises a rigid head portion cabin 401 for protecting the head portion of a human and a main cabin body 403 for protecting the lower portion of the head portion of a human, and one end of head portion cabin 401 that towards the main cabin body 403 is provided with an opening; rigid head portion cabin 401 and main cabin body 403 are both fixedly connected with the vehicle seat and head portion cabin 401 and main cabin body 403 are connected by adopting a plurality of flexible straps 405. As shown in FIG. 23, the head portion cabin 401 and the seat are fixedly connected via a secondary fixing strap 402 and a main fixing strap 404. Secondary fixing strap 402 is connected at the back of the vehicle seat, and main fixing strap 404 is connected at the LATCH interface or isofix interface at the lower end of the vehicle seat. Similarly, the outer portion of main cabin body 403 is fixedly connected with a secondary fixing strap 402 and main fixing strap 404. Secondary fixing strap 402 is connected at the back of a vehicle seat, and main fixing strap 404 is connected at the LATCH interface or isofix interface at the lower end of the vehicle seat.

As shown in FIG. 23, in Example 15, main cabin body 403 is designed as flexible bag type with a slide fastener 4010 provided on its top portion, main cabin body 403 is easy to open via slide fastener 4010, thus convenient to pass in and out.

Figure 25:
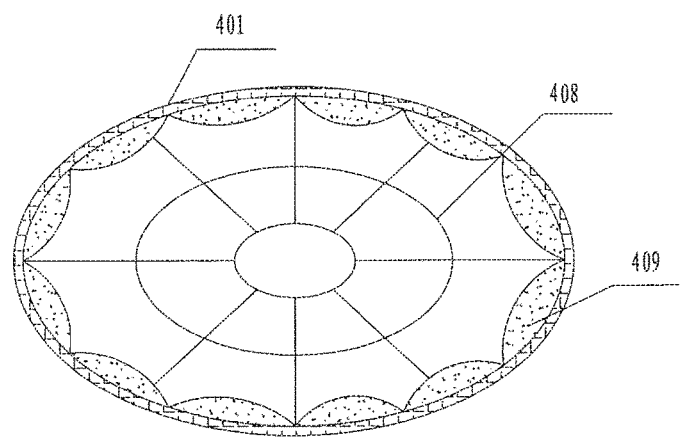
FIG. 25 is a transverse section view of the head portion cabin in FIG. 22.

As shown in FIG. 24, in the Example 15, head portion cabin 401 is provided with a shouldering 406 and an adjustable headrest 407 for position-limit. When a side collision happens, shouldering 406 can make the head and shoulder bear the force simultaneously to prevent compression on cervical vertebra, and head portion cabin 401 functions as a safety helmet in preventing collision and puncture. As shown in FIGS. 24 and 25, an inner side of head portion cabin 401 is embedded with a collision prevention net 408, and flexible pad 409 is filled between collision prevention net 408 and head portion cabin 401. Collision prevention net 408 and flexible pad 409 can further buffer impulsive force transmitted from outer side of head portion cabin 401, in particular the impulsive force generated when a side collision of a vehicle occurs. Flexible main cabin body 403 can protect the body of the passenger and prevent outthrow. Flexible main cabin body 403 can increase the contact areas with human body. The flexible material can effectively consume energy and increase collision time, and the human body rolling in the flexible bag-type main cabin body 403 can also effectively consume energy.

In order to achieve the purpose of reliable protection, head portion cabin 401 is made of insulating, thermostable, inflaming retarding, compression resisted and twisting resisted rigid materials, and main cabin body 403 is made of insulating, thermostable, inflaming retarding flexible materials.

Example 16

Figure 26:
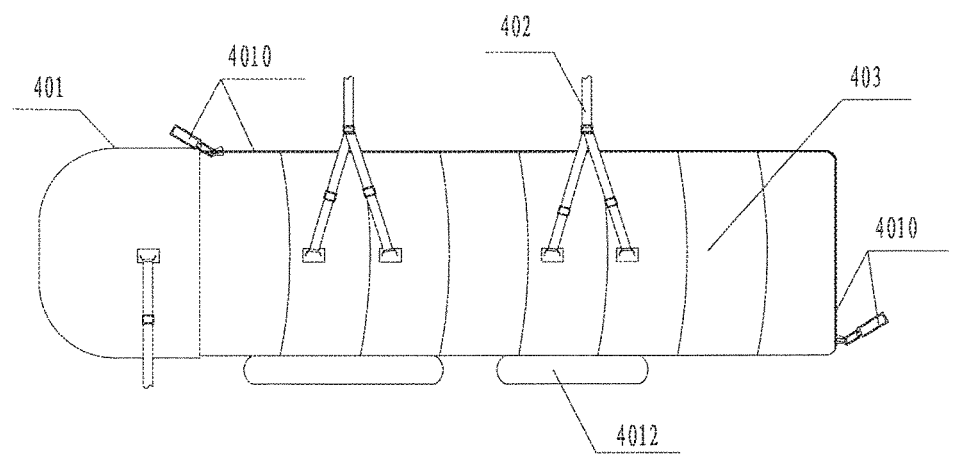
FIG. 26 is a plan view of the safety protection apparatus of Example 16 of the present invention.
Figure 27:
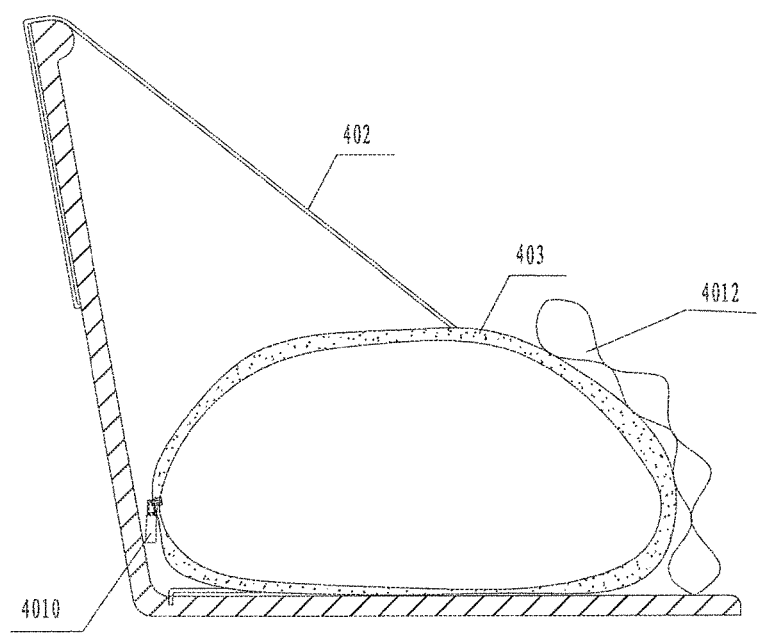
FIG. 27 is a transverse section view of the main cabin body shown in FIG. 26.

As shown in FIGS. 26 and 27, the difference between Example 16 and Example 15 lies in that the outer side of main cabin body 403 is suspended with an inflatable pad 4012, inflatable pad 4012 can buffer impulse force from the outside, and protect the passenger in main cabin body 403. The upper and front sides of main cabin body 403 can be provided as inflatable double-layer structure, which buffers the impulse force from the outside by the filled gas, so as to achieve better protection effect. Further, main cabin body 403 can adopt double-layer structure packed with flexible packing material to further buffer impact to the human body.

Example 17

Figure 28:
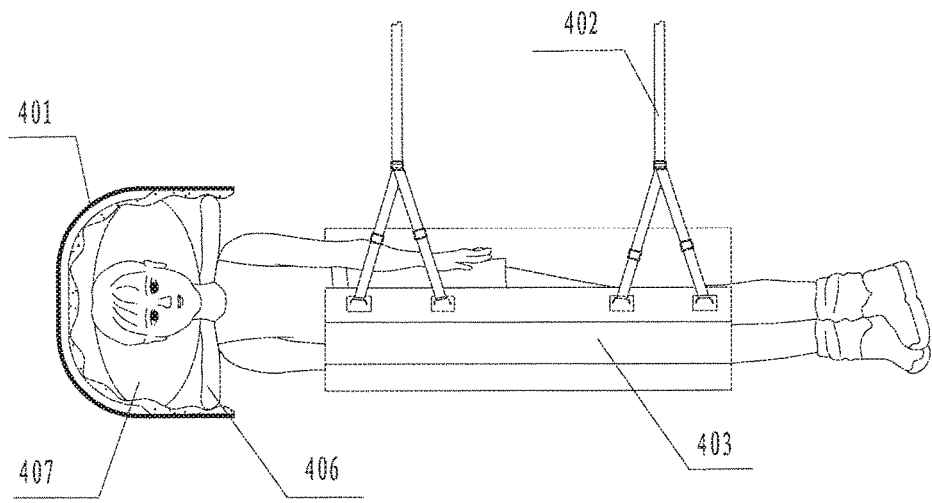
FIG. 28 is a structural schematic diagram of the safety protection apparatus of Example 17 of the present invention.

As shown in FIG. 28, the difference between Example 18 and Example 15 lies in that main cabin body 403 is rigid and made of rigid material, and in a semi-opened state; the upper side of main cabin body 403 is provided with an opening along the length direction thereof, through which the passenger can easy to get in and out of the main cabin body 403.

Example 18

Figure 29:
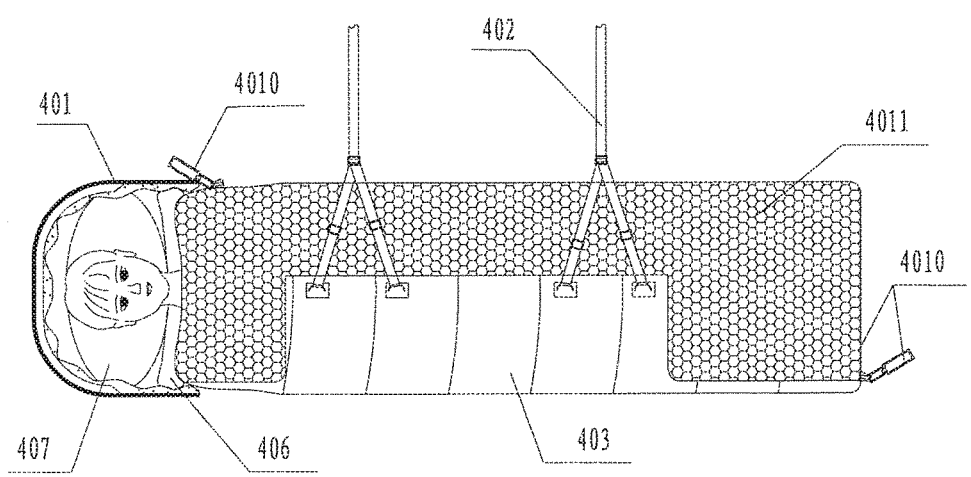
FIG. 29 is a structural schematic diagram of the safety protection apparatus of Example 18 of the present invention.

As shown in FIG. 29, the difference between Example 18 and Example 15 lies in that main cabin body 403 is flexible pocket-type structure. The inner side of main cabin body 403 is provided with a flexible inner net 4011, the flexible inner net 4011 is provided with a slide fastener 4010 thereon for facilitating passing in and out. The passenger lies on the flexible inner net 4011 and is covered by main cabin body 403, when a collision occurs, the passenger sways with the main cabin body 403 to achieve the purpose of buffering and decreases the risk of collision between human body and the components in the vehicle. In this example, it can improve the comfort for a passenger by adopting a ventilative flexible inner net 4011.

Example 19

Figure 30:
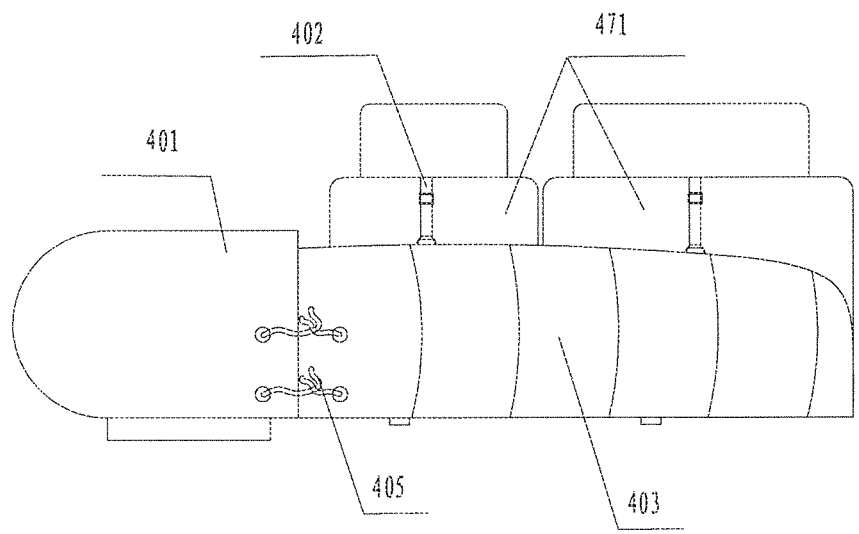
FIG. 30 is a structural schematic diagram of the safety protection apparatus of Example 19 of the present invention.
Figure 31:
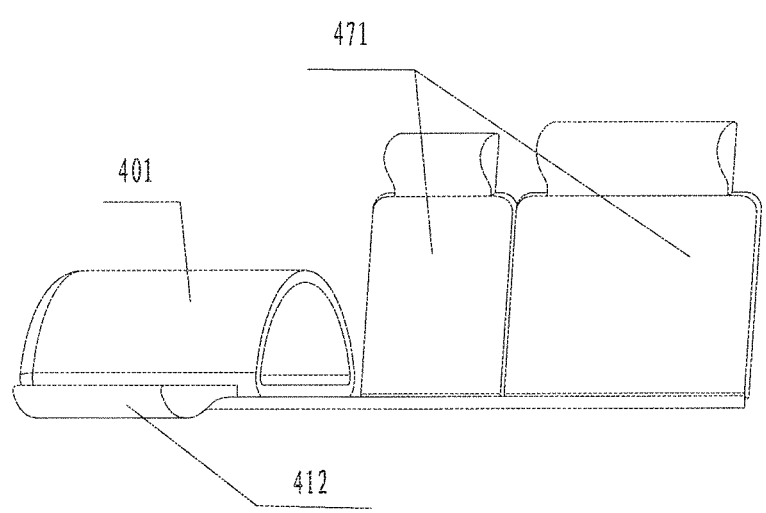
FIG. 31 is a stereostructural schematic diagram of the head portion cabin of the safety protection apparatus shown in FIG. 30 connected to the seat.
Figure 32:
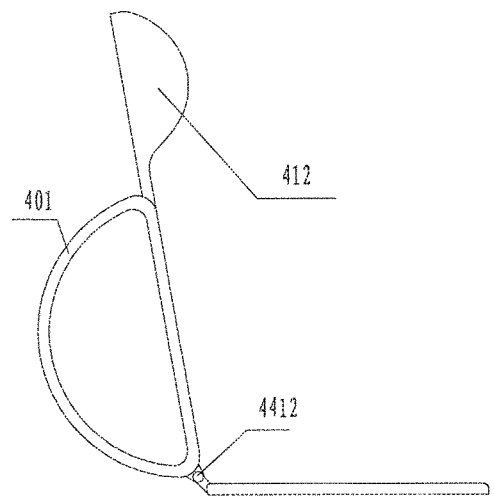
FIG. 32 is a structural schematic diagram of the safety protection apparatus shown in FIG. 30 when the head portion cabin is lifted.

As shown in FIGS. 30-32, the difference between Example 19 and Example 15 lies in that head portion cabin 401 is rotatably connected with seat 471 via hinge 4412. Obviously, in this example, head portion cabin 401 is rigid and is easy to use after lifting. As shown in FIG. 32, head portion cabin 401 can be lifted to be used as the backrest of seat 471 when it is not in use. A bump 412 extending from the front side of head portion cabin 401 is adapted for the shape of the backrest of seat 471 of the vehicle.

Example 20

Figure 33:
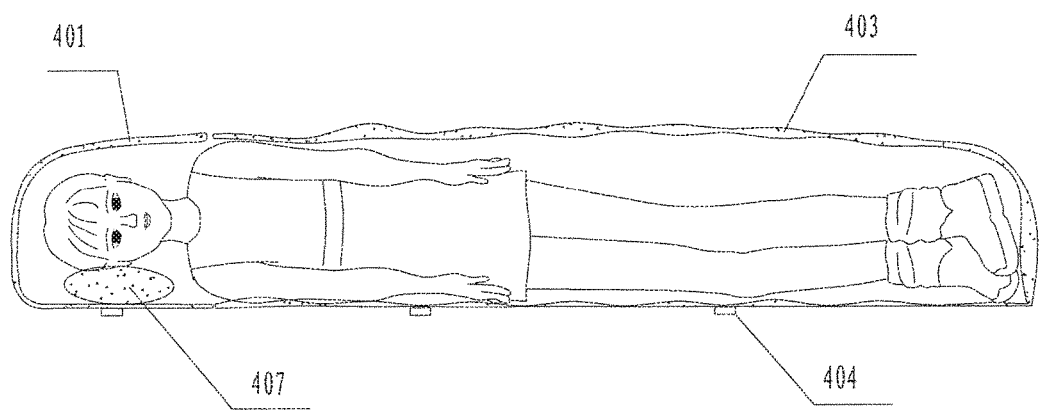
FIG. 33 is a longitudinal sectional view of the safety protection apparatus of Example 20 of the present invention.

FIG. 33 shows the longitudinal sectional situation of the safety protection apparatus of Example 20. As shown in FIG. 33, and with reference to FIG. 24, the difference between Example 20 and Example 15 lies in that head portion cabin 401 is flexible, and the flexible head portion cabin 401 and main cabin body 403 can buffer the impulse from the outside. When an accident happens, due to that the human body is within the flexible head portion cabin 401 and main cabin body 403, which corresponds to that a buffering is provided between the human body and other components in the vehicle, and thus can provide protection to the passengers in prone position, and have the advantage of simple structure and portable. Similarly, flexible head portion cabin 401 and main cabin body 403 are both inflatable double-layer structures, or double-layer structures that can be filled with flexible materials, which further improves effect of buffering.

Example 21

Example 21 of the present invention is illustrated by referring to FIGS. 22 to 24. The difference between Example 21 and Example 15 lies in: removing main cabin body 403 and only maintaining the rigid head portion cabin 401 that protects the head portion of human, adopting one or more restraint straps (not shown in figures) to restrain the lower portion of the head portion (trunk and legs); head portion cabin 401 is fixedly connected with the vehicle seat, the central part of the restraint strap is connected with the LATCH interface at the lower end of the vehicle seat via a LATCH joint, both ends of the restraint straps are provided with opposite plug and bayonet that are mated with each other. In use, first to open the plug and bayonet, and after lying, to close the plug and bayonet, then the human body can be fixed on the vehicle seat; at this time, the head portion of the human body is in head portion cabin 401, and his body is fixed on the seat. When a side collision and front collision occur, the passenger is under comprehensive protection, and only one head portion cabin 401 and a restraint strap that is similar with the safety belt are adopted, having the advantage of simple structure and easy to use.

To sum up the safety protection apparatus of Examples 15 to 21, it can provide comprehensive protection for the adults in prone position. Head portion cabin 401 protects the head portion, main cabin body 403 or restraint strap protect other parts of the body, which is suitable for long period travel, in particular for pregnant women and the old.

The fourth set of examples includes Examples 22 to 25, the safety protection apparatus is arranged in a cab in a truck to provide protection for the passengers in prone position. The fourth set of examples corresponds to the fourth embodiment described in the SUMMARY OF THE INVENTION.

Example 22

Figure 34:
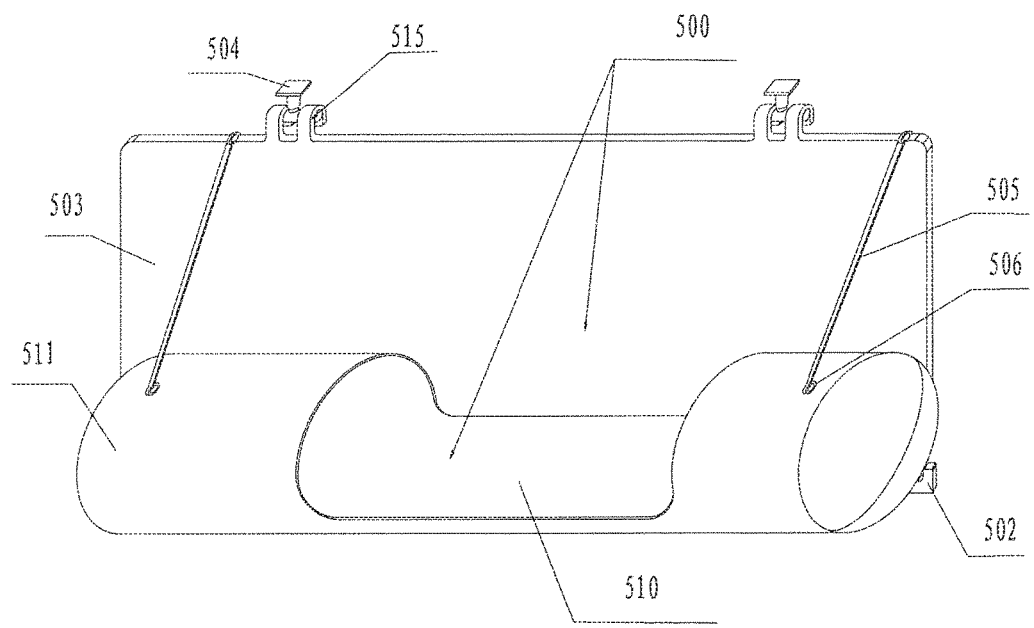
FIG. 34 is a stereostructural schematic diagram of the safety protection apparatus of Example 22 of the present invention.
Figure 35:
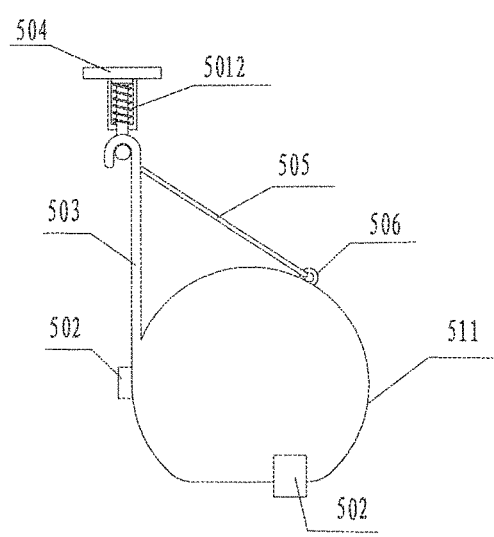
FIG. 35 is a side view of FIG. 34.

As shown in FIGS. 34 and 35, the safety protection apparatus of Example 22 comprises bed body 500 and a suspension connection mechanism that rotatably connects said bed body 500 at the top portion of the cab, and the lower portion of bed body 500 is provided with a damping component. In this example, bed body 500 comprises bed plate 510 that is horizontally provided and bed back 503 that is vertically provided. The damping component is a plurality of cushion pad 502 provided at outer side of both ends of bed back 503 and bed plate 510. The suspension connection mechanism comprises fixing member 504 that is fixedly connected with the top portion of the cab (not shown in figure) and rotation component 515 for rotatably connecting the upper end of bed back 503 with fixing member 504. Rotation component 515 in this example selects hinge, actually, rotation component 515 can also select other forms such as rotation shaft or hinge joint, etc. As shown in FIG. 34, both ends of bed plate 510 are respectively provided with protection cabin 511 for protecting human body, wherein one protection cabin 511 is used for protecting head portion of the human body, and the other is used for protecting feet portion. As the preferred manner, as shown in FIG. 35, in this example, a shock-absorption spring 5012 is further provided between rotation component 515 and faxing member 504, which can buffer the vibration during the process of driving and improve comfort, of course, rotation component 515 and fixing member 504 therebetween can adopt a direct rigid connection, such as a welding manner, etc. Fixing member 504 and the top portion of the cab can be the fixing connection manners such as welding and bolt connection, etc.

As shown in FIGS. 34 and 35, two protection cabins 511 are both provided with a connection ring 506. The connection rings 506 are respectively connected with the upper edge of bed back 503 via a bearing strap 505, thus to improve stability thereof. When a collision occurs, bed back 503 and bed plate 510 will rotate forwardly, and the human body in protection cabin 511 will sway with them to achieve a purpose of buffering, the damping component can consume energy and decrease the damage to the human body when a collision occurs. In the meantime, rigid protection cabin 511 can also prevent the damages to the human body by foreign matters such as the fragments generated by the collision.

Example 23

Figure 36:
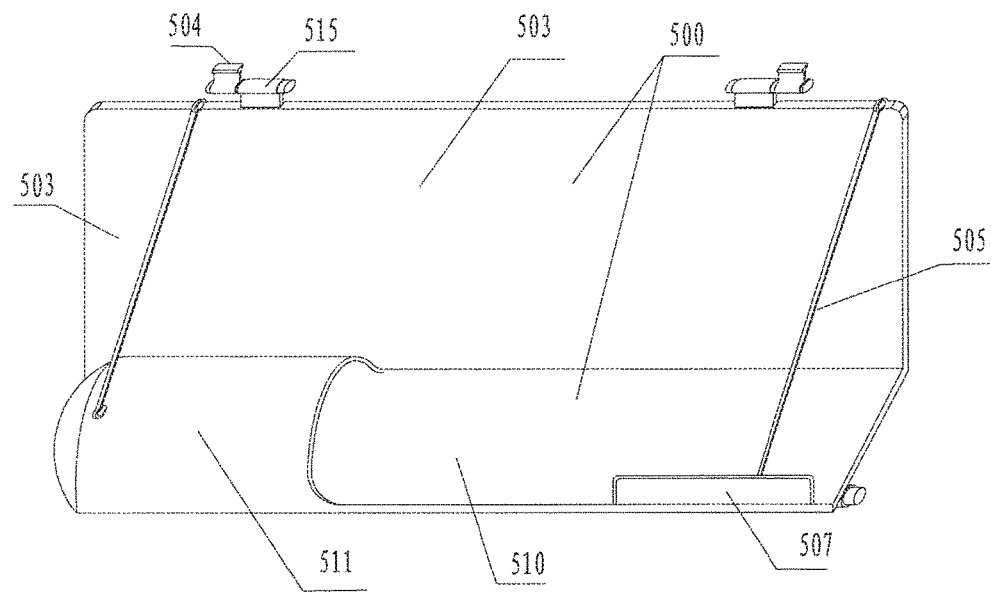
FIG. 36 is a stereostructural schematic diagram of the safety protection apparatus of Example 23 of the present invention.

As shown in FIG. 36, the difference between Example 23 and Example 22 is that one end of bed plate 510 has a protection cabin 511 for protecting the head portion of human, and the other end of bed plate has no protection cabin 511 but is provided with a buffer shield 507 at the front side thereof. The head portion of a human is protected via protection cabin 511, and the feet portion are protected via the front buffer shield 507. Protection cabin 511 and buffer shield 507 are both provided with connection rings 506 thereon, and connection rings 506 are respectively connected to the upper edge of bed back 503 via bearing strap 505. Compared with Example 22, the present example has the advantages of simple structure and easy to use.

Example 24

Figure 37:
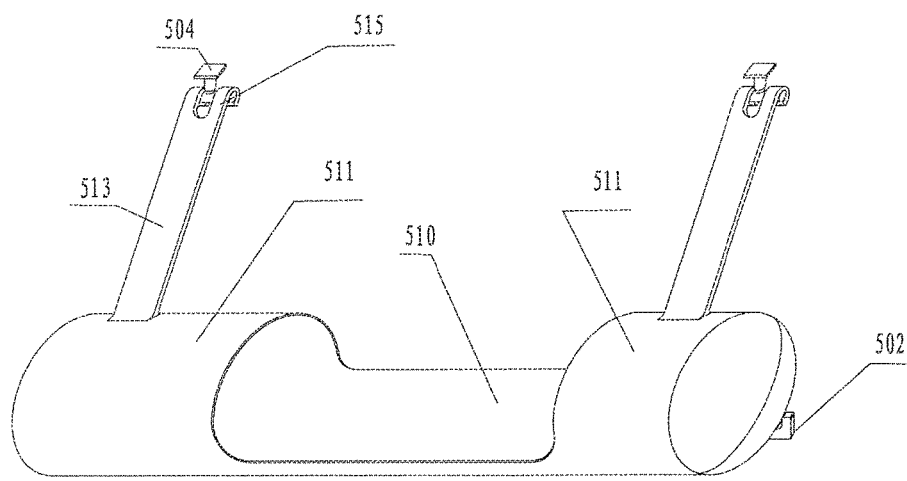
FIG. 37 is a stereostructural schematic diagram of the safety protection apparatus of Example 24 of the present invention.
Figure 38:
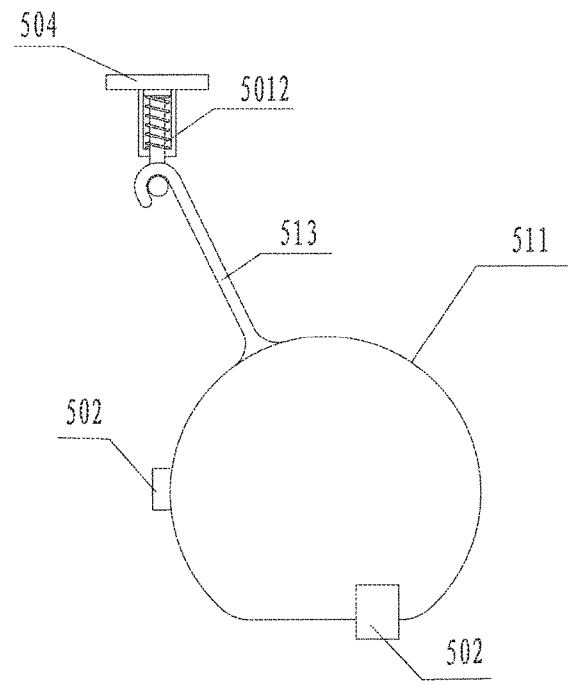
FIG. 38 is a side view of FIG. 37.

As shown in FIGS. 37 and 38, and with reference to FIG. 34, the difference between Example 24 and Example 22 lies in that only bed plate 510 but not bed back 503 is provided, protection cabin 511 is directly connected to the rotation component via a plate-shaped support bar 513.

Example 25

Figure 39:
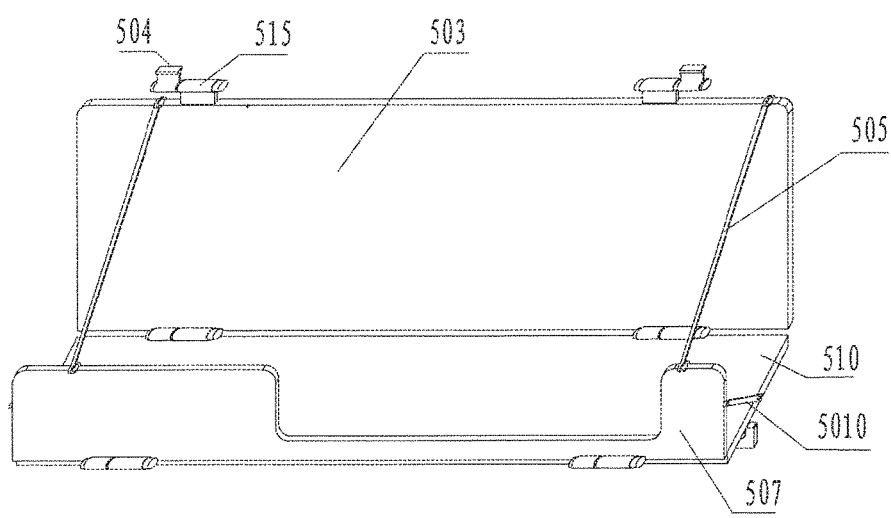
FIG. 39 is a stereostructural schematic diagram of the safety protection apparatus of Example 25 of the present invention.
Figure 40:
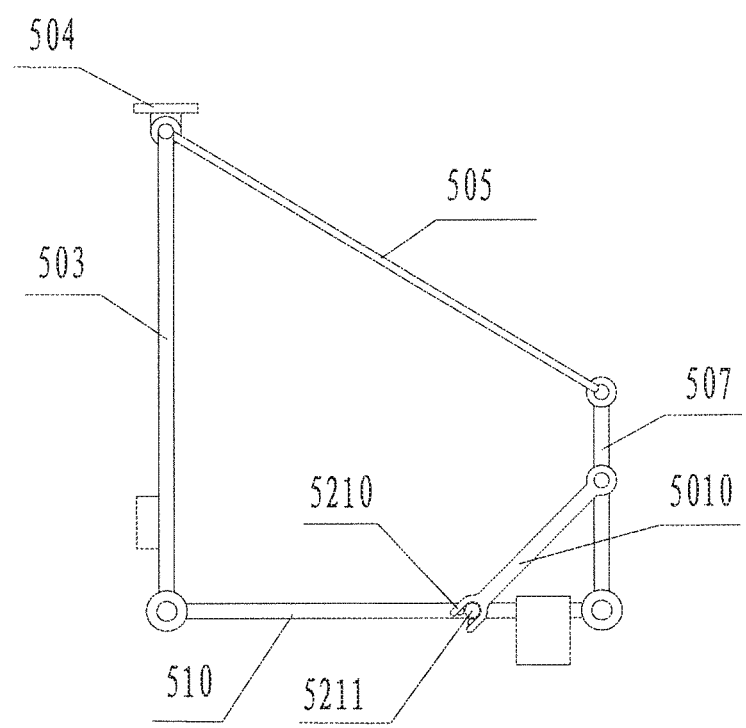
FIG. 40 is a side view of FIG. 39 (the bed body is in a usage state)
Figure 41:
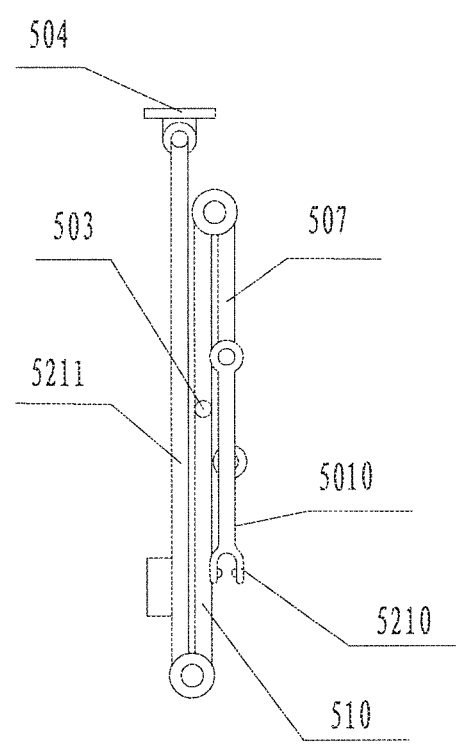
FIG. 41 is a schematic diagram when the bed body of FIG. 40 is in a folded state.

As shown in FIGS. 39, 40 and 41, the difference between Example 25 and Example 22 lies in that the front side of bed plate 510 is provided with a buffer shield 507, bed plate 510 and bed back 503 as well as bed plate 510 and buffer shield 507 are both hinge connection, the upper edge of buffer shield 507 is hinged with a connecting rod 505, the upper end of connecting rod 505 is connected with rotation component 504; the central part of buffer shield 507 is hinged with a positioning bar 5010, the other end of positioning bar 5010 is provided with a bayonet 5210, and bed plate 510 is provided with a chuck 5211 that is detachably mated with bayonet 5210. As shown in FIG. 40, in a used state, to open the bed body, bed plate 510 is in a horizontal position and bed back 503 is in a vertical position; providing bayonet 5210 on chuck 5211, ensuring the stability in positions of buffer shield 507 and bed plate 510 via a positioning bar 5010, thus to make the side view as the shape of right trapezoid shown in FIG. 40. When not used, as shown in FIG. 41, to open positioning bar 5010, rotate bed plate 510 and buffer shield 507 to superpose them on bed back 503. Then to connect bed plate 510 and buffer shield 507 in a state shown in FIG. 41 with bed back 503, which can reduce the occupied space.

Example 26

Figure 42:
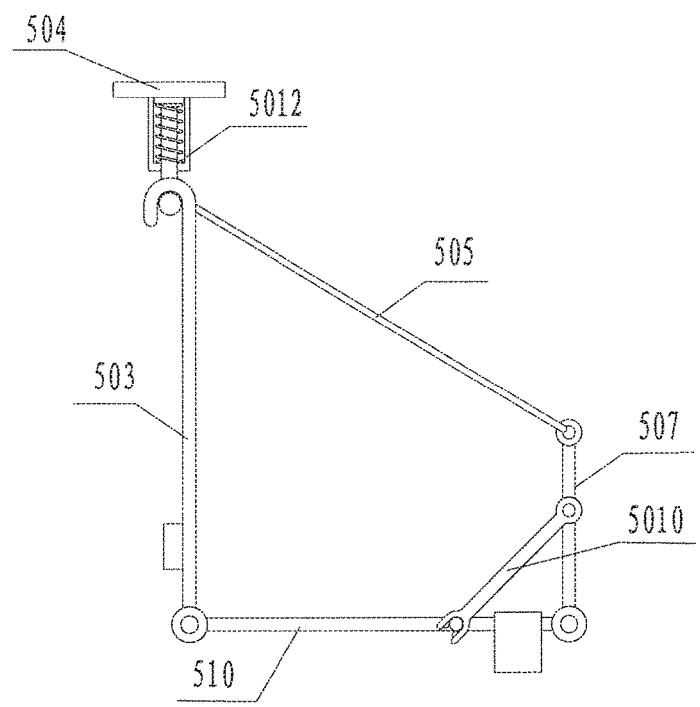
FIG. 42 is a side view of the safety protection apparatus of Example 26 of the present invention (the bed body is in a usage state)

As shown in FIG. 42, the difference between Example 26 and Example 25 lies in that rotation component 515 and fixing member 504 therebetween are provided with a shock-absorption spring 5012 that can buffer the vibration generated during driving and improve comfort of use.

The fifth set of examples includes Examples 27 to 30, each safety protection apparatus of the fifth set of examples comprises a protection cabin and a bed that can slide relative to it within said protection cabin. The fifth set of examples corresponds to the fifth embodiment described in the SUMMARY OF THE INVENTION.

Example 27

Figure 43:
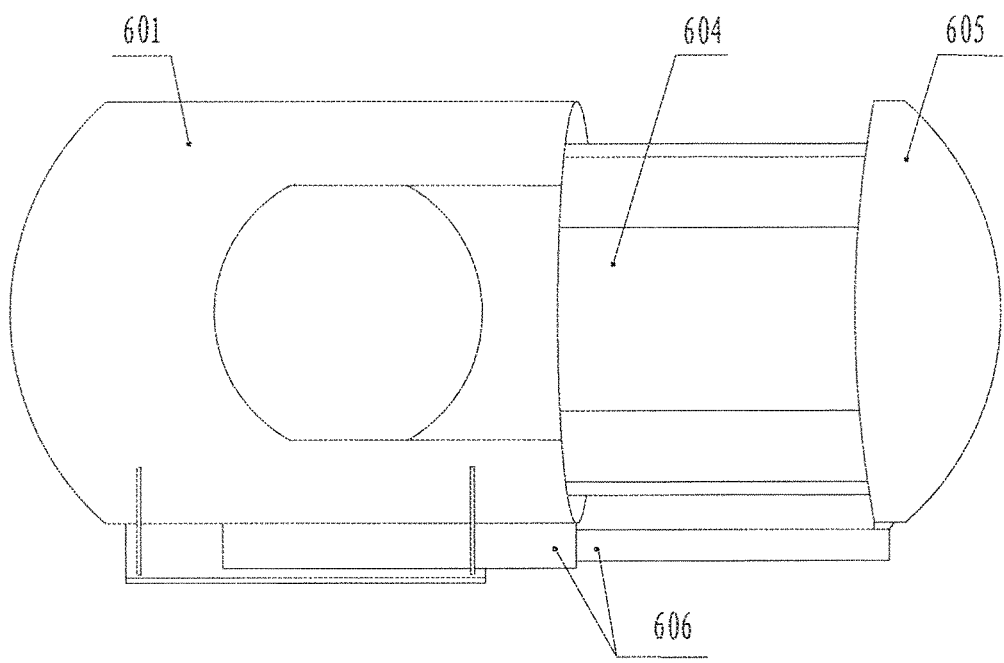
FIG. 43 is a plan view of the safety protection apparatus of Example 27 of the present invention.
Figure 44:
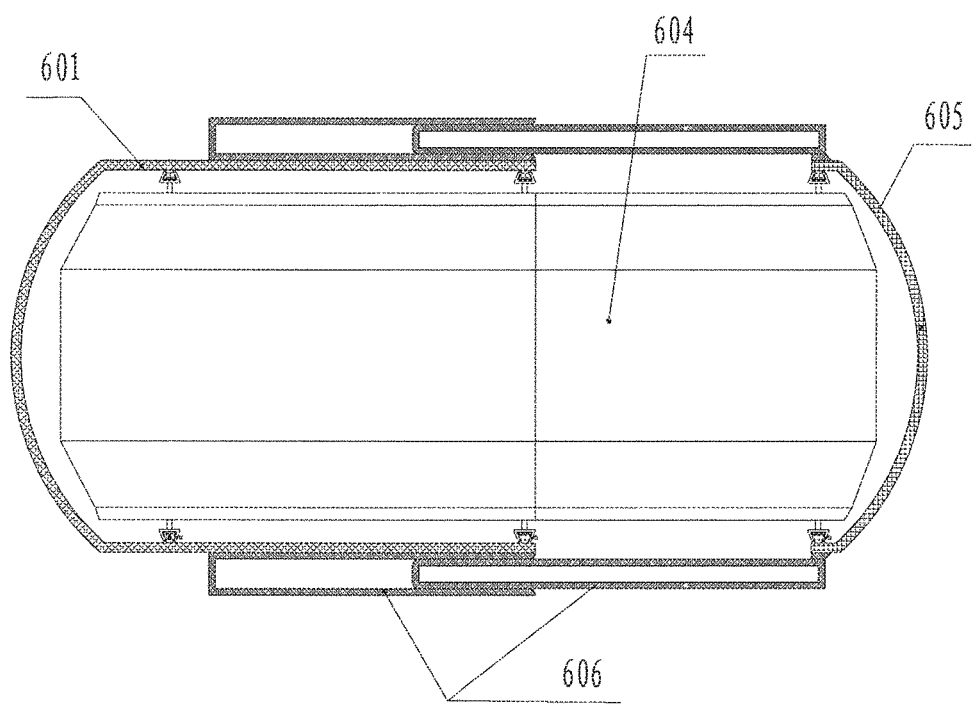
FIG. 44 is a longitudinal section view of FIG. 43.
Figure 45:
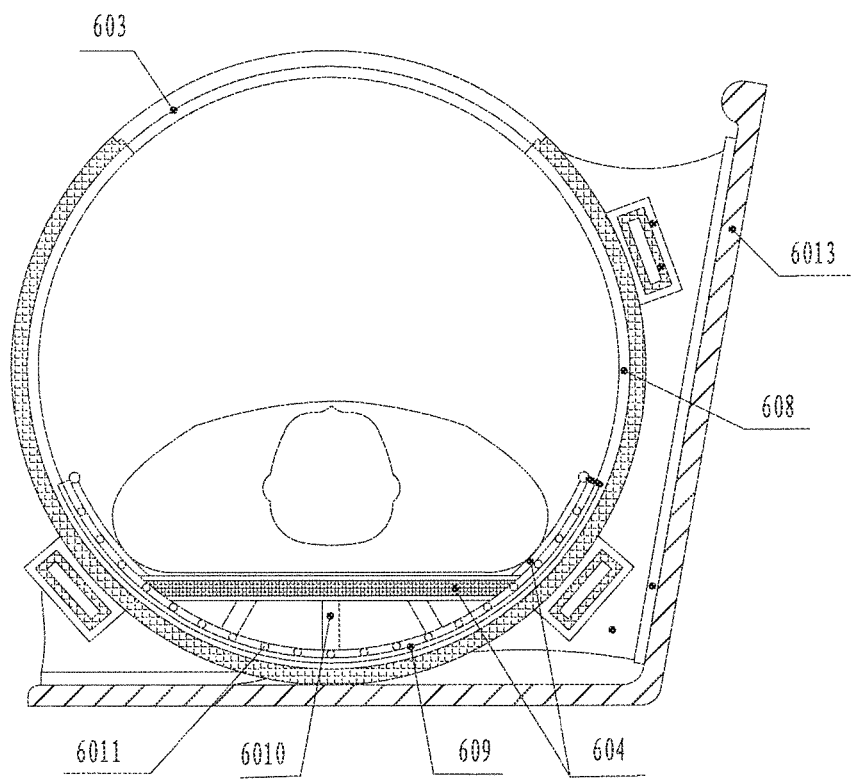
FIG. 45 is a transverse section view of FIG. 43.

As shown in FIGS. 43-45, the safety protection apparatus of Example 27 of the present invention comprises cylindrical protection cabin 601 that is fixedly connected to vehicle seat 6013 and bed 604 provided within protection cabin 601; protection cabin 601 is provided with a plurality of ring lead rails 608 along the circumferential direction thereof, ring lead rail 608 is provided with slide rail 609 thereon to in cooperation therewith. Both sides of bed 604 extend upwardly to cover the passenger in prone position, the lower side of bed 604 is fixedly connected to a plurality of slide rails 609 via support shore 6010 and moves synchronously; one end of protection cabin 601 is of open shape, one end of bed 604 extends out of the end of protection cabin 601 that is provided with an opening.

Figure 46:
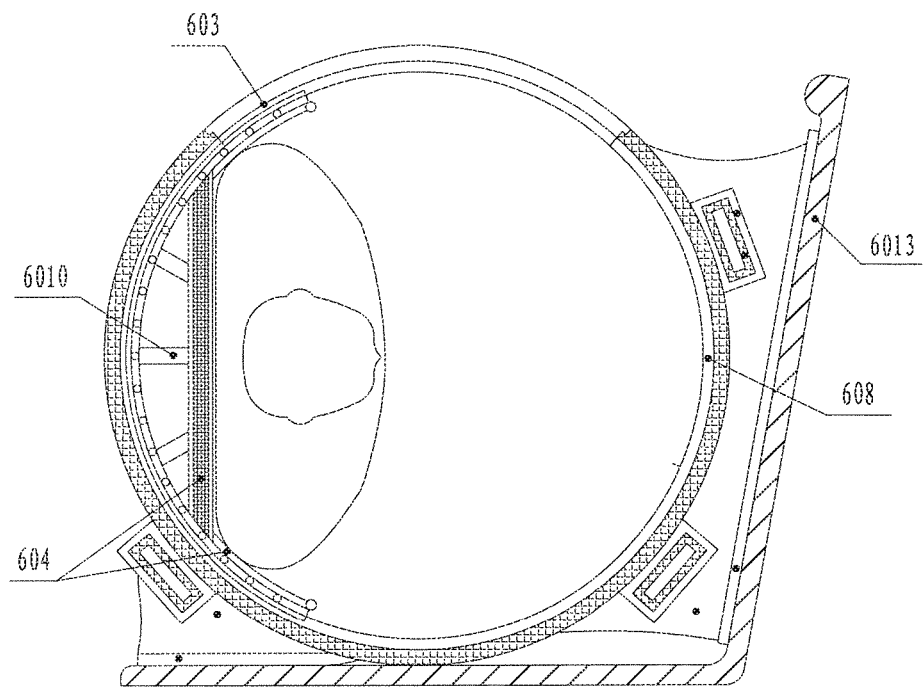
FIG. 46 is a schematic diagram when the slide rail of FIG. 45 slides in the lead rail.

As shown in FIG. 45, protection cabin 601 is put on the vehicle seat 6013 and is fixed on it. Protection cabin 601 is provided along the width direction of the vehicle, and a passenger lies on bed 604 in prone position, the head portion of the human is within protection cabin 601, and both feet extend out of protection cabin 601. The human body and bed 604 therebetween can be secured via a safety belt. As shown in FIG. 46, when the vehicle brakes emergently or an accident happens, slide rail 609 slides along ring lead rail 608, due to inertia, the human body covered by bed 604 and bed 604 together slide with slide rail 609, which prevents the human body from crushing forwardly directly to achieve a purpose of buffering.

As shown in FIG. 45, a plurality of pin rollers 6011 are provided between ring lead rail 608 and slide rail 609. Pin roller 6011 can consume energy to stabilize bed 604. Further, in order to consume energy in collision and stabilize bed 604 more quickly, a damping component, such as damping pad, adhesive damping oil and damping spring, etc., is provided between ring lead rail 608 and slide rail 609. After all, when braking emergently or an accident occurs, seat 6013 dramatically decreases in speed until stop, while the human body and bed 604 will continue to move forwardly due to inertia, lift along ring lead rail 608, and part of kinetic energy will be transformed to potential energy, which can buffer the impulsive force to the human body. As a preferred solution, ring lead rail 608 can be also provided with position-limit members thereon, which can prevent the height of the human body and bed 604 from rising to an excessive height.

When applying the safety protection apparatus of the present example to infants, in order to facilitate observing, protection cabin 601 is provided with transparent observing window (not shown in figures).

As shown in FIGS. 43 and 44, the safety protection apparatus of the present example further comprises housing cover 605 positioned on the outer side of the end of bed 604 that extends out of protection cabin 601. Housing cover 605 is connected to protection cabin 601 via telescopic rod 606. When the vehicle deforms in its side, housing cover 605 bears the action force to bed 604 so as to protect bed 604 from deformation or a relative small deformation, protect the passenger on bed 604 from another direction, and prevent the foreign matter flying transversely from damaging the human body on bed 604.

Example 28

Figure 47:
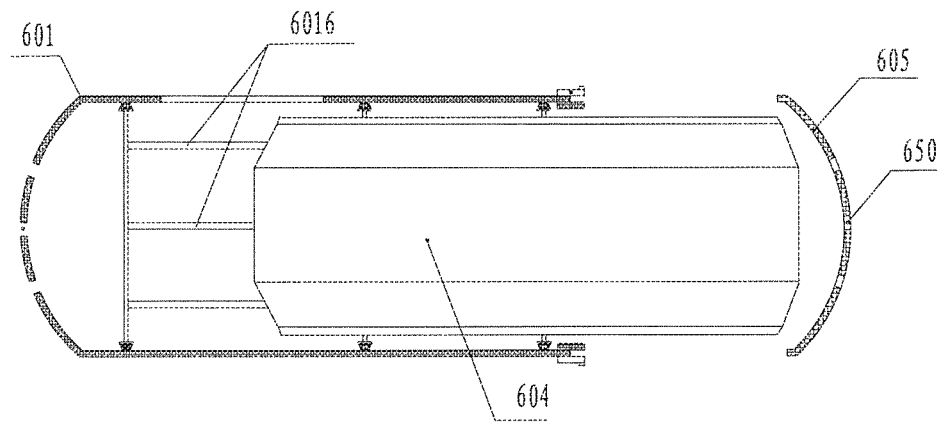
FIG. 47 is a plan view of the safety protection apparatus of Example 28 of the present invention.

As shown in FIG. 47, the difference between Example 28 and Example 27 lies in that: protection cabin 601 is provided with slideway 6016 along the length direction thereof, slideway 6016 is fixed on slide rail 609, and the lower side of bed 604 is provided with guide bar (not shown) meted with slideway 6016. It is easy to make bed 604 pass in and out of protection cabin 601. Bed 604 is pulled out from protection cabin 601 to place a child on it, or let an adult to lie on, after which pushed inwardly so as to enter into protection cabin 601.

As shown in FIG. 47, housing cover 605 is provided with a vent 650 thereon; similarly, protection cabin 601 is provided with a plurality of vents to ensure the ventilation between protection cabin 601 and the outer environment.

Example 29

Figure 48:
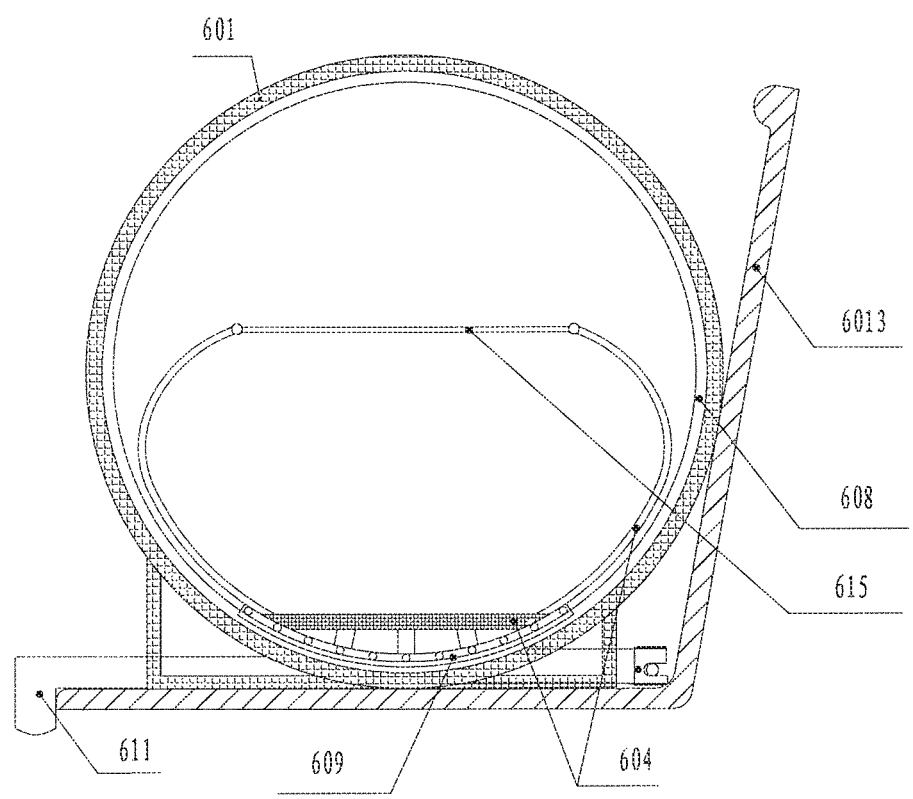
FIG. 48 is a transverse section view of the safety protection apparatus of Example 29 of the present invention.

As shown in FIG. 48, the difference between Example 29 and Example 27 lies in that the bottom of protection cabin 601 is provided with a bracket 611 for limiting the position of protection cabin 601. Bracket 611 adopts LATCH joint to be fixedly connected to the lower end of seat 6013, wherein LATCH joint can be replaced with ISOFIX joint. Preferably, in this example, a safety protective net 615 is provided above bed 604.

Example 30

Figure 49:
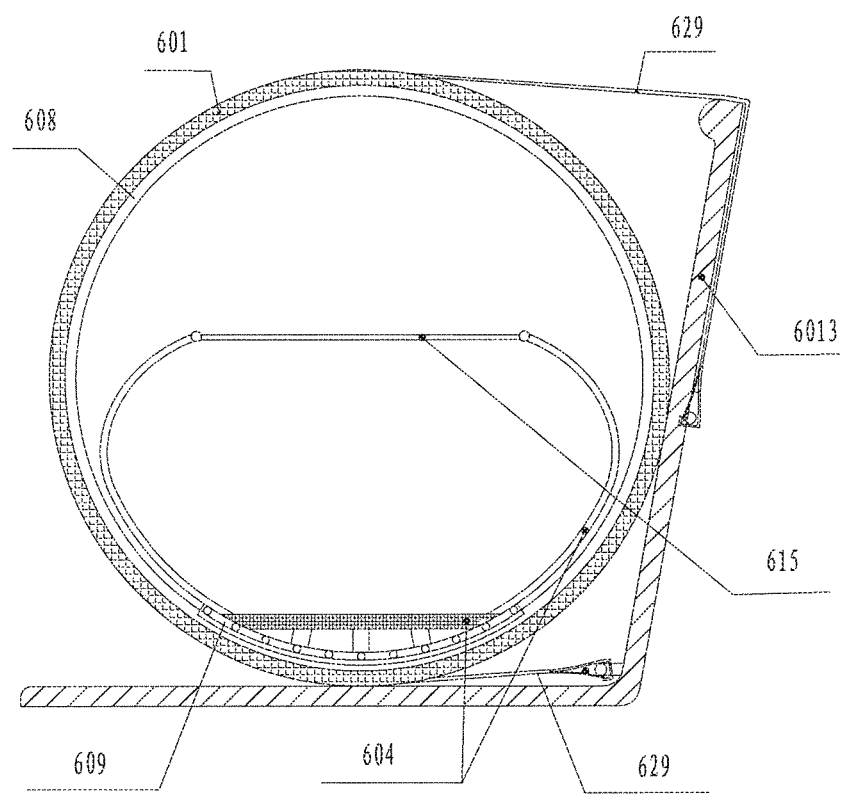
FIG. 49 is a transverse section view of the safety protection apparatus of Example 30 of the present invention.
Figure 50:
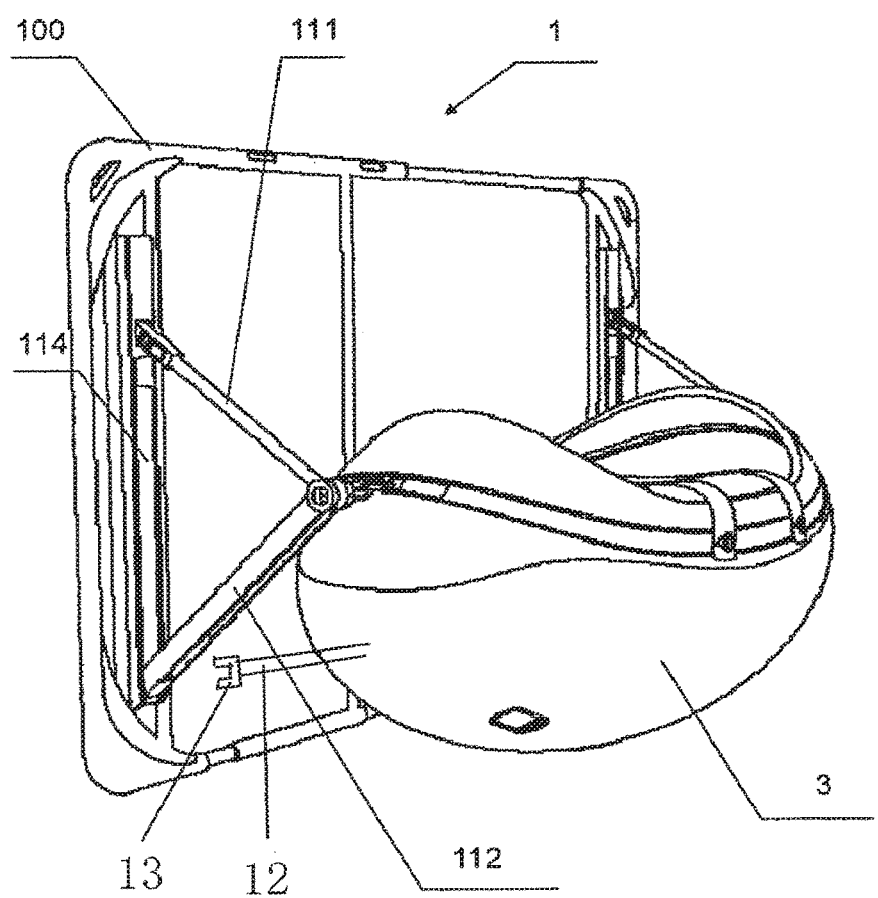
FIG. 50 is a structural schematic diagram of the safety protection apparatus of FIG. 9A of the present invention in which the backframe is provided with a slide slot along a vertical direction.
Figure 51:
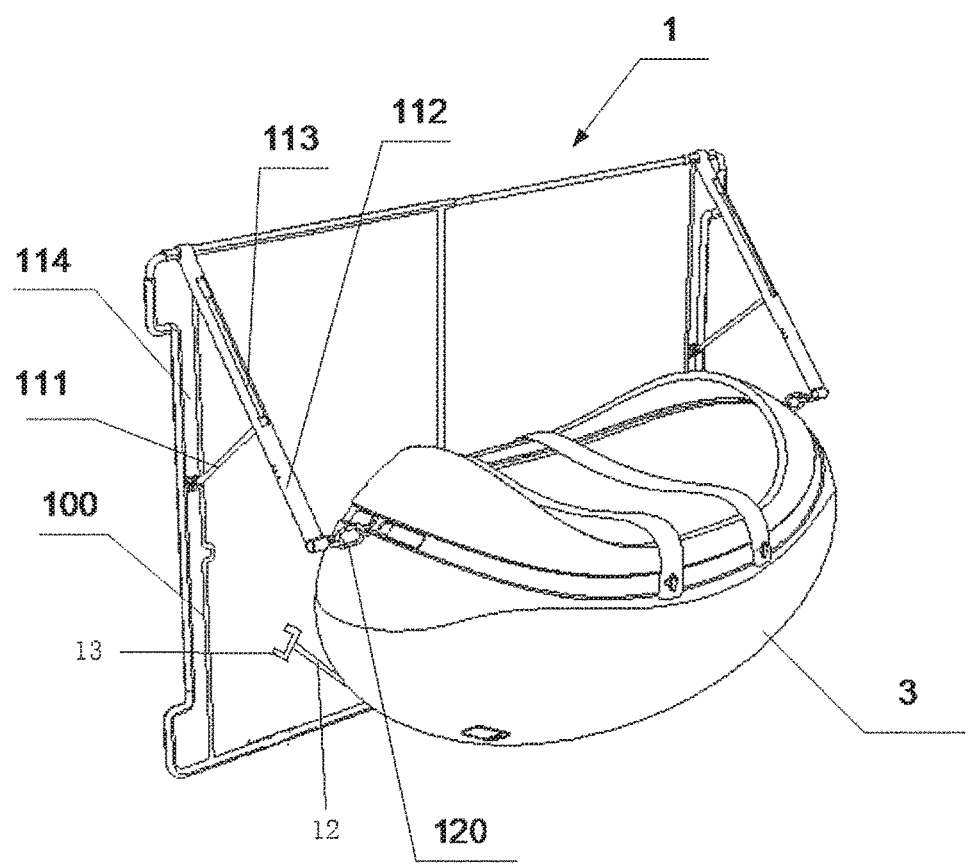
FIG. 51 is a structural schematic diagram of the safety protection apparatus of FIG. 10 of the present invention in which the backframe is provided with a slide slot along a vertical direction.
Figure 52:
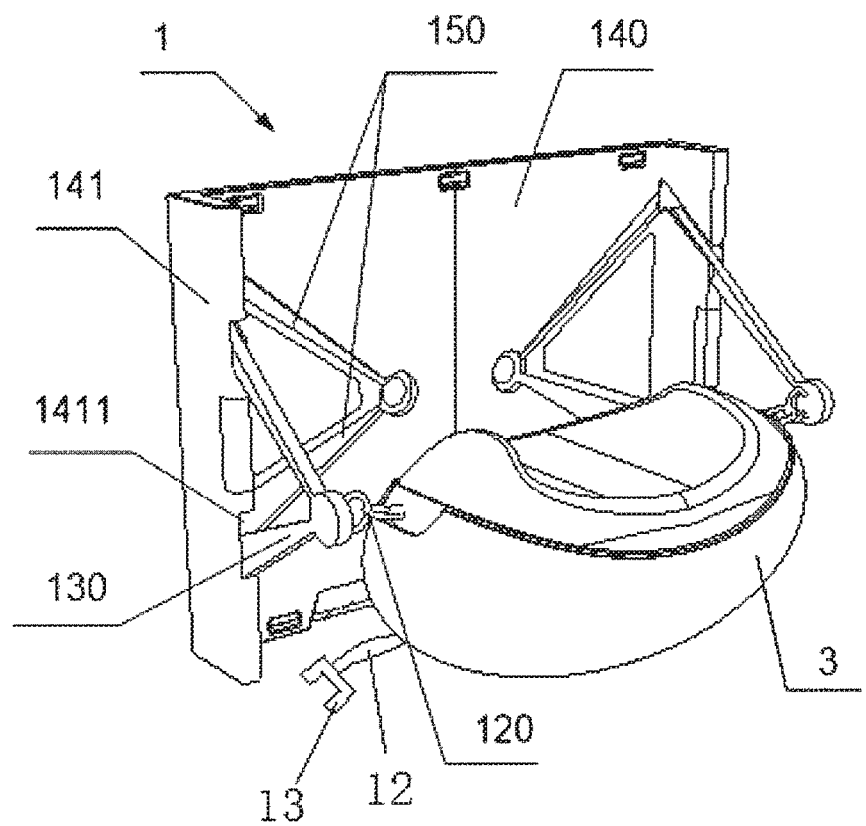
FIG. 52 is a structural schematic diagram of the safety protection apparatus of FIG. 11 of the present invention in which the bottom edges of hanging brackets are respectively rotatably disposed at both ends of the backplate along a vertical direction.

As shown in FIG. 49, the difference between Example 30 and Example 27 lies in that protection cabin 601 is bound on seat 6013 by a plurality of fixing straps 629. Fixing strap 629 is provided around protection cabin 601. One end of fixing strap 629 is provided with ISOFIX joint to be fixedly connected at the lower end of seat 6013, the other end is provided with a ISOFIX joint to be fixedly connected at the back of seat 6013. The above can be replaced with LATCH joint so as to mete with the LATCH interface on seat 6013.

Protection cabin 601, besides the way as in Example 30 and Example 29 to be connected to seat 6013, can also adopt rigid connection manner to be fixedly connected to seat 6013, here, the detailed description is omitted.

To sum up, in the fifth set of examples from Example 27 to Example 30, the provision of the protection cabin can prevent the damage of vehicle to human body when deforms, by providing a bed that can slide in the protection cabin, to transform kinetic energy to potential energy by sliding, thus buffering crush to human body due to emergent braking or collision, and providing comprehensive protection for the adults or infants in prone position.

All of the above Example 1 to Example 30 explains as an example to apply the safety protection apparatus to automobile. A person skilled in the art can use the safety protection apparatus of the present invention on the motor traffic means such as passenger car, truck or steamboat etc. to provide reliable protection for passengers in prone position, which should be considered as the protection scope of the present invention. Certainly, the above are the preferred embodiments of the present invention, and what should be pointed out is that for a person skilled in the art, under the condition of not departing from the principle of the present invention, certain improvement and polish can be made, which are also regarded as the protection scope of the present invention.

What is claimed is:

1. A safety protection apparatus for motor traffic means, characterized in that, comprising a support frame fixedly connected to a seat of said motor traffic means and a protection cabin for accommodating an infant, wherein said protection cabin and support frame are rotatably connected, and a damping shock absorption component is provided between said protection cabin and support frame or between said protection cabin and the seat, said damping shock-absorption component is a resilient damping belt with one end thereof fixedly connected to said protection cabin and the other end provided with a LATCH joint or ISO FIX joint for being connected to said seat; said protection cabin is ellipsoid or a shape with both ends being hemisphere and a central portion being cylindrical.

2. The safety protection apparatus for motor traffic means according to claim 1, characterized in that, said protection cabin is integrally rigid or flexible housing, wherein an upper end of said protection cabin is rotatably connected to said support frame.

3. The safety protection apparatus for motor traffic means according to claim 1, characterized in that, an upper portion of said protection cabin is provided with an opening at which covered with protective net or protective strap.

4. A safety protection apparatus for motor traffic means, characterized in that, comprising a support frame fixedly connected to a seat of said motor traffic means and a protection cabin for accommodating an infant, wherein said protection cabin and support frame are rotatably connected, and a damping shock absorption component is provided between said protection cabin and support frame or between said protection cabin and the seat, said damping shock-absorption component is a resilient damping belt with one end thereof fixedly connected to said protection cabin and the other end provided with a LATCH joint or ISO FIX joint for being connected to said seat said protection cabin is ellipsoid or a shape with both ends being hemisphere and a central portion being cylindrical, wherein said protection cabin is suspended at an upper end of said support frame by means of a plurality of fixing straps.

5. A safety protection apparatus for motor traffic means, characterized in that, comprising a support frame fixedly connected to a seat of said motor traffic means and a protection cabin for accommodating an infant, wherein said protection cabin and support frame are rotatably connected, and a damping shock absorption component is provided between said protection cabin and support frame or between said protection cabin and the seat, said damping shock-absorption component is a resilient damping belt with one end thereof fixedly connected to said protection cabin and the other end provided with a LATCH joint or ISO FIX joint for being connected to said seat; said protection cabin is ellipsoid or a shape with both ends being hemisphere and a central portion being cylindrical, wherein the support frame comprises a rectangular backframe connected to the seat and two hanging brackets for hanging said protection cabin, both ends of said backframe are provided with a slide slot along a vertical direction; each of said hanging brackets comprises a main lever with one end rotatably connected on said backframe and an advance lever with one end slidably connected at the slide slot and the other end rotatably connected to the main lever.

6. The safety protection apparatus for motor traffic means according to claim 5, characterized in that, a lower end of backframe of said support frame is provided with a LATCH joint or ISO FIX joint connected to the seat, an upper end of said backframe is provided as an inverted U-shaped clamping portion, said backframe is clamped on a backrest of the seat via the clamping portion.

7. A safety protection apparatus for motor traffic means, characterized in that, comprising a support frame fixedly connected to a seat of said motor traffic means and a protection cabin for accommodating an infant, wherein said protection cabin and support frame are rotatably connected, and a damping shock absorption component is provided between said protection cabin and support frame or between said protection cabin and the seat, said damping shock-absorption component is a resilient damping belt with one end thereof fixedly connected to said protection cabin and the other end provided with a LATCH joint or ISO FIX joint for being connected to said seat; said protection cabin is ellipsoid or a shape with both ends being hemisphere and a central portion being cylindrical, wherein the support frame comprises a rectangular backframe connected to the seat and two hanging brackets for hanging said protection cabin, both ends of said backframe are provided with a slide slot along a longitudinal direction; each of said hanging brackets comprising a main lever with one end rotatably connected at said backframe and an advance lever with one end slidably connected to the slide slot; said main lever is provided with an adjustment slot along a length direction thereof, the other end of said advance lever being slidably connected to said main lever by means of the adjustment slot.

8. A safety protection apparatus for motor traffic means, characterized in that, comprising a support frame fixedly connected to a seat of said motor traffic means and a protection cabin for accommodating an infant, wherein said protection cabin and support frame are rotatably connected, and a damping shock absorption component is provided between said protection cabin and support frame or between said protection cabin and the seat, said damping shock-absorption component is a resilient damping belt with one end thereof fixedly connected to said protection cabin and the other end provided with a LATCH joint or ISO FIX joint for being connected to said seat; said protection cabin is ellipsoid or a shape with both ends being hemisphere and a central portion being cylindrical, wherein the support frame comprises a rectangular backplate connected to the seat and two triangular hanging brackets for hanging said protection cabin, bottom edges of said hanging brackets are respectively rotatably disposed at both ends of said backplate along a vertical direction, both ends of said backplate are provided with a support plate for supporting the hanging brackets in an open state, said support plate is provided with a positioning slot to clamp said hanging brackets in the open state, said backplate is provided with a receiving slot for receiving said hanging brackets in a folded state.

* * * * *